United States Patent
Matsui et al.

(10) Patent No.: US 7,760,393 B2
(45) Date of Patent: Jul. 20, 2010

(54) COLOR PROCESSING METHOD AND APPARATUS THEREOF, AND INSTALLER OF DEVICE DRIVER

(75) Inventors: Tomohiro Matsui, Setagaya-ku (JP); Hiroaki Nashizawa, Koto-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 11/468,477

(22) Filed: Aug. 30, 2006

(65) Prior Publication Data
US 2007/0070368 A1    Mar. 29, 2007

(30) Foreign Application Priority Data
Aug. 31, 2005   (JP)   ............... 2005-252478
Aug. 31, 2005   (JP)   ............... 2005-252680

(51) Int. Cl.
H04N 1/60   (2006.01)
H04N 1/46   (2006.01)
G03F 3/08   (2006.01)
G06K 9/00   (2006.01)

(52) U.S. Cl. .............. 358/1.9; 358/2.1; 358/504; 358/518; 358/523; 358/527; 358/537; 358/538; 382/162; 382/167

(58) Field of Classification Search ............ 358/518, 358/1.9, 1.15, 2.1, 504, 527, 519, 520, 521, 358/523, 537, 538; 382/162, 167; 345/593, 345/543, 556, 643
See application file for complete search history.

(56) References Cited

U.S. PATENT DOCUMENTS 5,502,580 A    3/1996   Yoda et al.
5,736,989 A *  4/1998   Lhotak .................. 345/593
6,542,634 B1   4/2003   Ohga ..................... 382/167
7,079,270 B2 * 7/2006   Kiyosu et al. .......... 358/1.15
2006/0072133 A1* 4/2006 Han et al. ................. 358/1.9

FOREIGN PATENT DOCUMENTS

| JP | 7-154623 | 6/1995 |
|---|---|---|
| JP | 8-324040 | 12/1996 |
| JP | 9-1875 | 1/1997 |
| JP | 2000-50086 | 2/2000 |
| JP | 2001-309198 | 11/2001 |
| JP | 2004-7052 | 8/2004 |

OTHER PUBLICATIONS

Office Action dated Nov. 2, 2009 in JP 2005-252478.

* cited by examiner

*Primary Examiner*—Charlotte M Baker
(74) *Attorney, Agent, or Firm*—Fitzpatrick, Cella, Harper & Scinto

(57) ABSTRACT

Creation of integrated color conversion data for color processing requires a large computation volume and much time in case of a device and GMA used for the first time. Hence, first color conversion data is stored in a memory, second color conversion data different from the first color conversion data is retrieved, and integrated color conversion data is generated from the first color conversion data and the second color conversion data. The generated integrated color conversion data is stored in the memory, so that the integrated color conversion data is read out from the memory and is used upon application of color processing according to the first color conversion data and the second color conversion data to color data.

6 Claims, 27 Drawing Sheets

F I G. 12
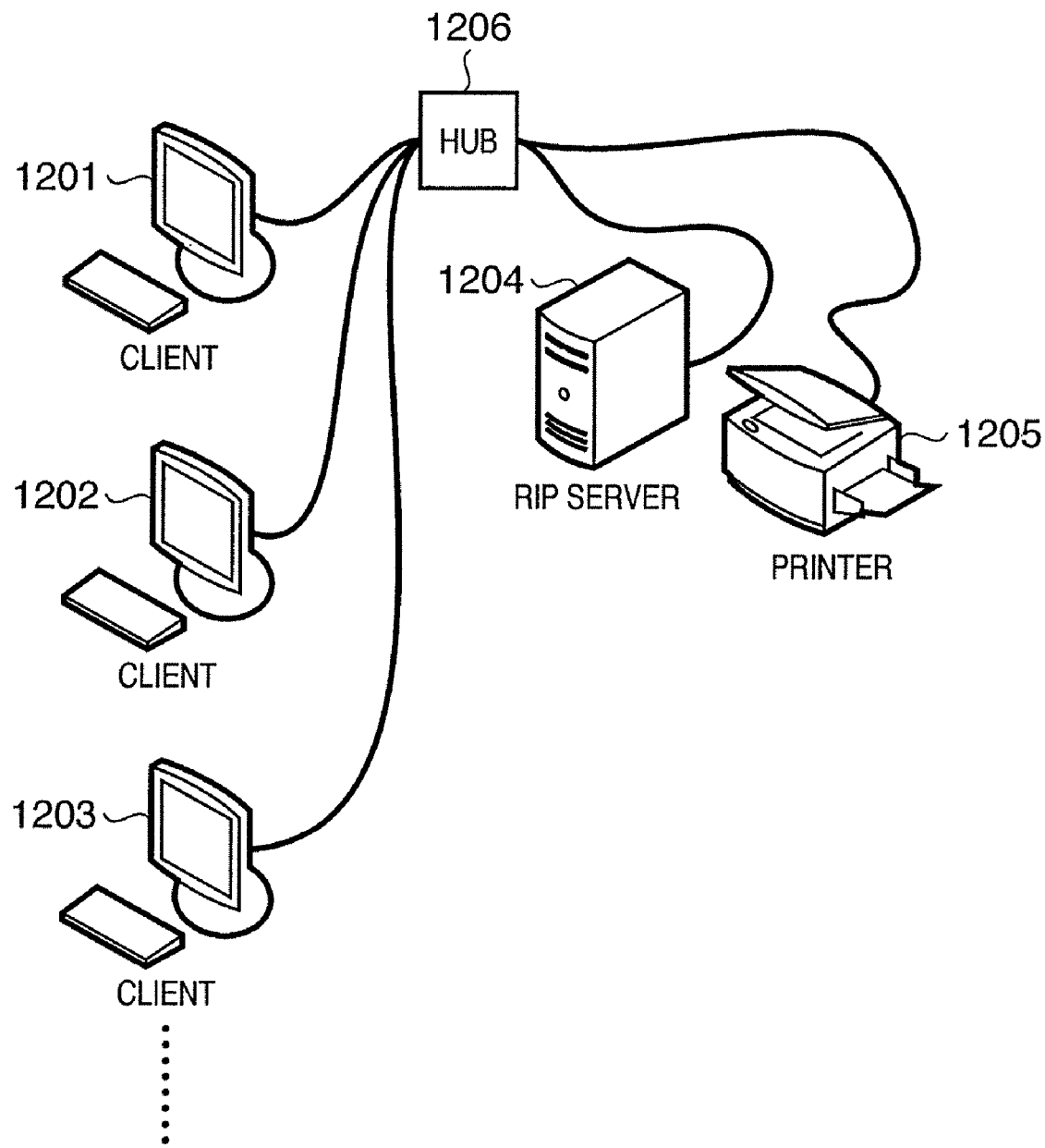

COLOR PROCESSING METHOD AND APPARATUS THEREOF, AND INSTALLER OF DEVICE DRIVER

BACKGROUND OF THE INVENTION

1. Field of the Invention

The present invention relates to color processing for converting image data of an input device into that for an output device, and installation, uninstallation, and creation of conversion characteristic data for the color processing.

2. Description of the Related Art

Japanese Patent Application Laid-Open No. 2000-50086 describes a method of implementing high-precision color matching between an input image and output image independently of the viewing conditions on the input side and output side. This technique initially converts input data which depends on the color space of an input device into data of a color space that does not depend on any devices based on the viewing conditions on the input side via a conversion table, conversion matrix, or conversion function (to be collectively referred to as a "conversion function" hereinafter). Note that the color space of the input device will be referred to as an "input color space," the color space that does not depend on any devices will be referred to as a "device-independent color space (DIC)," and the color space of an output device will be referred to as an "output color space" hereinafter. Next, a forward converter converts the data of the DIC into data of a human color appearance space. Then, on the color appearance space, gamut mapping is executed to absorb differences between a gamut of the input device and a gamut of the output device. An inverse converter then converts the data of the color appearance into data of a DIC based on the viewing conditions on the output side. Finally, the data of the DIC is converted into output data of the output color space by the conversion function.

Creation of the conversion function requires complicated arithmetic processing and much time. Therefore, when the conversion function is created according to the viewing conditions for every color matching, high-speed color matching processing cannot be attained.

Hence, the technique of Japanese Patent Application Laid-Open No. 2000-50086 caches the created conversion function, and executes actual color matching processing using the cache data, thus speeding up the color matching processing.

FIG. 1 is a block diagram showing the practical arrangement of a color matching system.

A source device color converter 101 converts data of the color space of a source device into data of a DIC. A gamut mapping unit 102 maps the gamut of the data input from the source device color converter 101 onto that of a destination device. A destination device color converter 103 converts the data input from the gamut mapping unit 102 into data of the color space of the destination device.

In such color matching system, if respective color conversions are applied to input color data by calculations, enormous amounts of time are required. Hence, a technique that creates a lookup table (LUT) by integrating a plurality of color conversions, and applies color matching to input color data using the created lookup table has been proposed. However, when the plurality of color conversions are integrated every time color matching is applied to the input color data, integration of the color conversions requires much time, and may cause a throughput drop of the color matching processing. In order to suppress the throughput drop, data of the integrated color conversion (to be referred to as "integrated color conversion data" hereinafter) may be cached. However, the integrated color conversion data must be created at least once per color matching, and the throughput drops at that time.

SUMMARY OF THE INVENTION

The first aspect of the present invention discloses a method of generating integrated color conversion data from a plurality of different color conversion data required to apply color processing to color data and saving the integrated color conversion data in a memory, comprising the steps of: storing first color conversion data in the memory; retrieving second color conversion data different from the first color conversion data; generating the integrated color conversion data from the first color conversion data and the second color conversion data; and storing the generated integrated color conversion data in the memory so that the integrated color conversion data is read out from the memory and is used upon application of color processing according to the first color conversion data and the second color conversion data to color data.

According to the present invention, integrated color conversion data can be efficiently and appropriately generated.

The second aspect of the present invention discloses a method of generating integrated color conversion data from a plurality of different color conversion data required to apply color processing to color data and saving the integrated color conversion data in a memory, comprising the steps of: storing first color conversion data in the memory; retrieving second color conversion data different from the first color conversion data; generating the integrated color conversion data from the first color conversion data and the second color conversion data; storing the generated integrated color conversion data in the memory so that the integrated color conversion data is read out from the memory and is used upon application of color processing according to the first color conversion data and the second color conversion data to color data; deleting color conversion data saved in the memory; and selecting and deleting the integrated color conversion data which corresponds to the deleted color conversion data and is saved in the memory.

According to the present invention, integrated color conversion data which becomes unnecessary can be efficiently deleted.

The third aspect of the present invention discloses a method of applying, to data of a color space depending on an input device, input conversion for converting into data of a device-independent color space, gamut mapping for mapping on data of a gamut of an output device, and output conversion for converting into data of a color space depending on the output device, the method comprising the steps of: generating individual conversion characteristic data of one of the input conversion, the gamut mapping, and the output conversion for each device information indicating one of the input device and the output device, and for each conversion setting; generating integrated conversion characteristic data by combining conversion characteristics of the input conversion, the gamut mapping, and the output conversion for each combination of the device information of the input device and the output device, and for each conversion setting; converting input data into output data using one of the individual conversion characteristic data and the integrated conversion characteristic data; editing the conversion setting of one of the input conversion, the gamut mapping, and the output conversion; and modifying the individual conversion characteristic data and the integrated conversion characteristic data in accordance with the edited contents.

According to the present invention, when independent conversion characteristic data is modified, since integrated conversion characteristic data obtained by integrating the individual conversion characteristic data is modified, color processing that reflects the modification result can be done even in a color matching workflow including different components.

The fourth aspect of the present invention discloses a method of applying, to data of a color space depending on an input device, input conversion for converting into data of a device-independent color space, gamut mapping for mapping on data of a gamut of an output device, and output conversion for converting into data of a color space depending on the output device, the method comprising the steps of: generating individual conversion characteristic data of one of the input conversion, the gamut mapping, and the output conversion for each device information indicating one of the input device and the output device, and for each conversion setting; generating integrated conversion characteristic data by combining conversion characteristics of the input conversion, the gamut mapping, and the output conversion for each combination of the device information of the input device and the output device, and for each conversion setting; converting input data into output data using one of the individual conversion characteristic data and the integrated conversion characteristic data; editing the conversion setting of one of the input conversion, the gamut mapping, and the output conversion; modifying the individual conversion characteristic data and the integrated conversion characteristic data in accordance with the edited contents; and managing a use log of the integrated conversion characteristic data, wherein the modifying step includes a step of determining the integrated conversion characteristic data to be modified based on the use log.

According to the present invention, since integrated conversion characteristic data to be modified is determined based on the use log of the integrated conversion characteristic data, the load required to modify the integrated conversion characteristic data can be reduced.

Further features of the present invention will become apparent from the following description of exemplary embodiments with reference to the attached drawings.

BRIEF DESCRIPTION OF THE DRAWINGS

FIG. 12 is a diagram showing the arrangement of an RIP system that performs color management;

DESCRIPTION OF THE EMBODIMENTS

Installation processing according to preferred embodiments of the present invention will be described in detail hereinafter with reference to the accompanying drawings.

First Embodiment

Color Conversion Data Creation Sequence

A sequence for creating color conversion data in the system shown in FIG. 1 will be described first.

Figure 2:
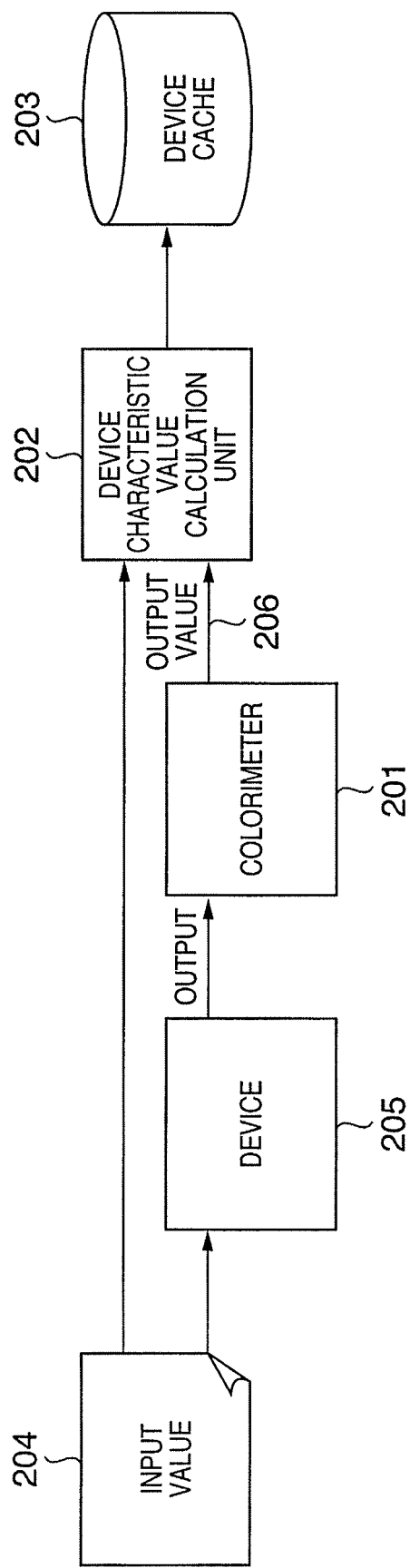
FIG. 2 is a diagram for explaining the sequence for creating color conversion data.

FIG. 2 is a diagram for explaining the sequence for creating color conversion data required when the source device is a monitor and the destination device is a CMYK printer.

An input value 204 such as RGB, CMYK, or the like, which corresponds to an Lab value of each grid point of grids obtained by evenly dividing, e.g., an Lab color space is input to a device 205 (monitor and CMYK printer). A color output from the device 205 is measured by a colorimeter 201 to obtain an output value (Lab value) of the device corresponding to the input Lab value. In this manner, data indicating correspondence between the input Lab value and output Lab value, i.e., the color reproduction characteristics of the device 205, is obtained. A device characteristic value calculation unit 202 calculates color conversion data for each device, e.g., a gamma value of the monitor or an LUT of the CMYK printer. The color conversion data obtained in this way is saved in a memory. Such color conversion data 203 which is created for each device and is saved in a memory will be referred to as a "device cache" hereinafter. Upon execution of color conversion of the device 205 corresponding to the device cache 203, the color conversion data creation processing shown in FIG. 2 need not be repeated.

Note that the device caches including the color conversion data of the monitor and CMYK printer have been explained. However, device caches to be described hereinafter also include color conversion data of input devices such a scanner, digital camera, and the like. Also, the method of crating color conversion data based on the colorimetric value of a device is not limited to the one shown in FIG. 2, and other known methods may be applied.

Figure 1:
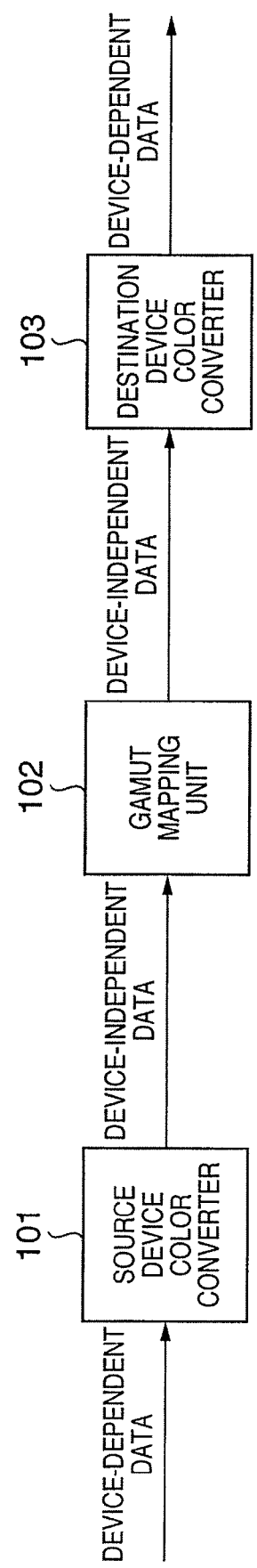
FIG. 1 is a block diagram showing the arrangement of a color matching system.
Figure 3:
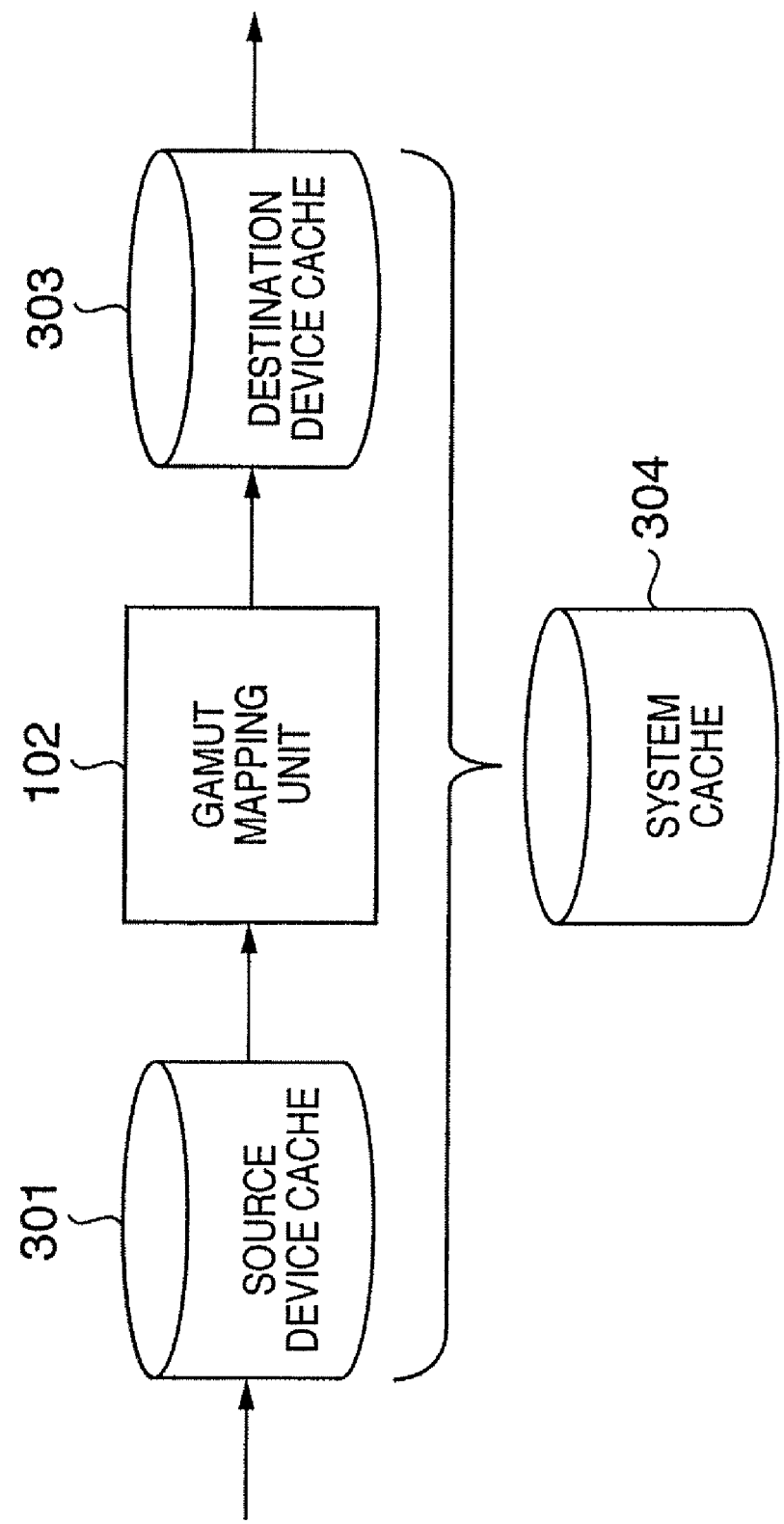
FIG. 3 is a diagram showing a state wherein the arrangement shown in FIG. 1 is replaced by device caches.

FIG. 3 is a diagram showing a state wherein the arrangement shown in FIG. 1 is replaced by device caches.

The source device color converter 101 is replaced by a source device cache 301, and the destination device color converter 103 is replaced by a destination device cache 303. Furthermore, when the gamut mapping algorithm (GMA) of the gamut mapping unit 102 is specified to, e.g., saturation priority, the conversion characteristics indicating the relationship between an input value and an output value in a color conversion system are fixed. Therefore, color conversion data 304 for a specific color conversion system can be created by integrating the source device cache 301, the conversion characteristics of the gamut mapping unit 102 with the specific GMA, and the destination device cache 303. The integrated color conversion data 304 will be referred to as a "system cache" hereinafter. Color matching processing corresponding to a combination of the specific input and output devices and GMA can be executed based on the system cache in a short period of time.

When device caches and system cache are not created upon execution of the color matching processing, these caches are created and are used in subsequent processing. However, creation of the device caches and system cache require a large computation volume and takes much time. When the device caches and system cache which become unnecessary remain stored in the memory, the memory resources are wastefully consumed.

A method of shortening the creation time of the system cache and a method of deleting the device caches and system cache which become unnecessary from the memory without exerting any load on the user will be described hereinafter.

[Upon Installation of Device Driver]

Figure 4:
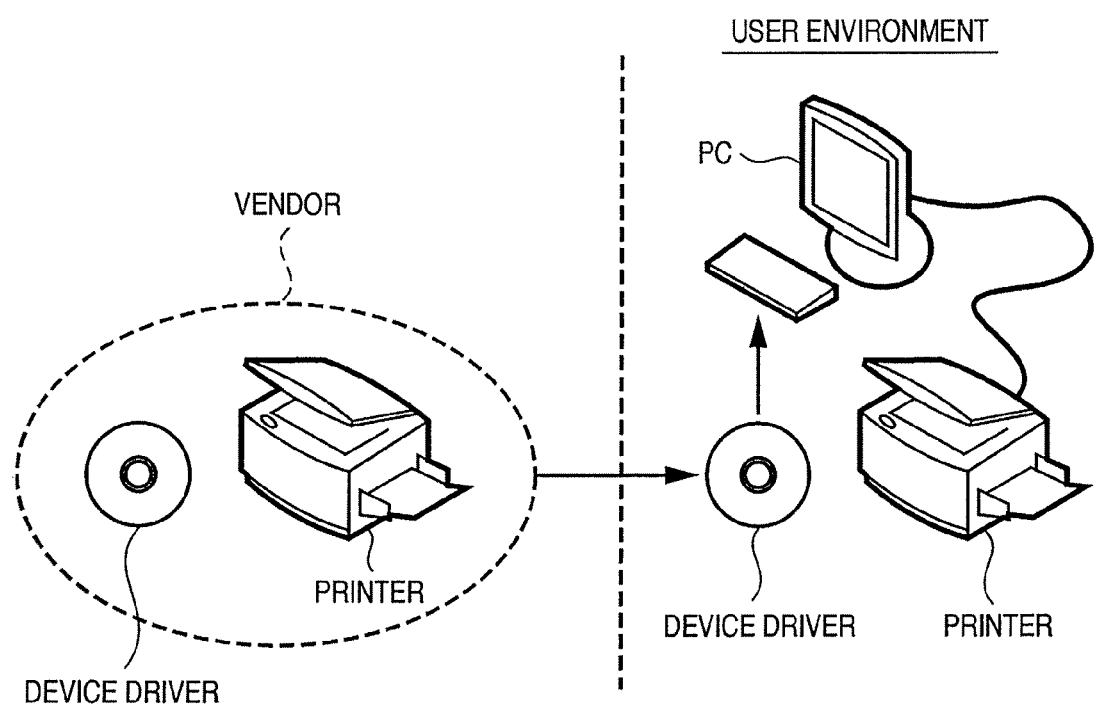
FIGS. 4 and 5 are views for explaining a device driver distribution method.
Figure 5:
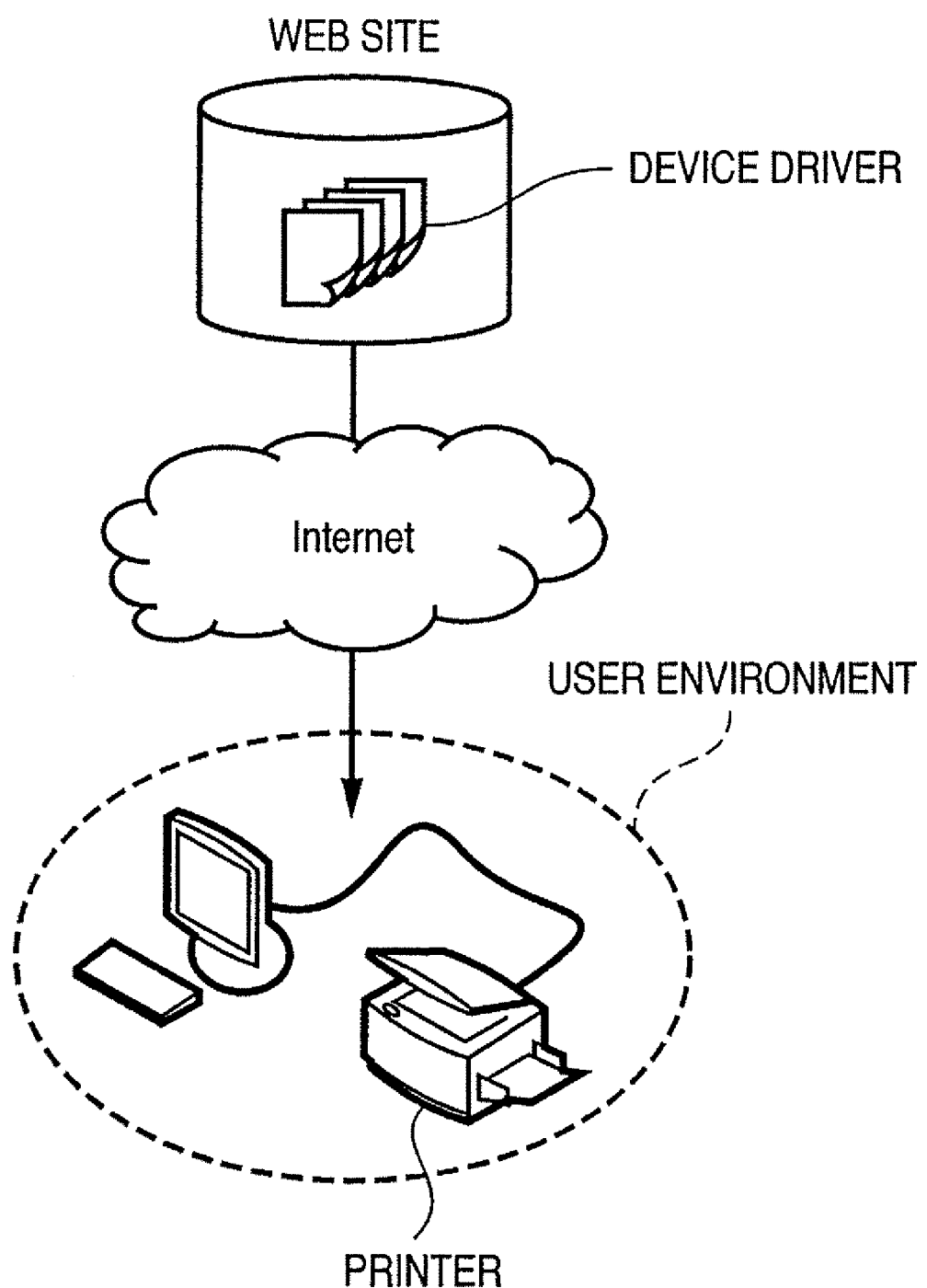

When the user of a computer wants to use a device (printer, monitor, or the like), he or she normally installs a driver of that device in the computer. A device vendor delivers the device attached with a device driver, as shown in FIG. 4, so as to distribute the driver to the device user. Alternatively, the vendor publishes device drivers on a Web site, so that the user can download the device driver, as shown in FIG. 5.

Figure 6:
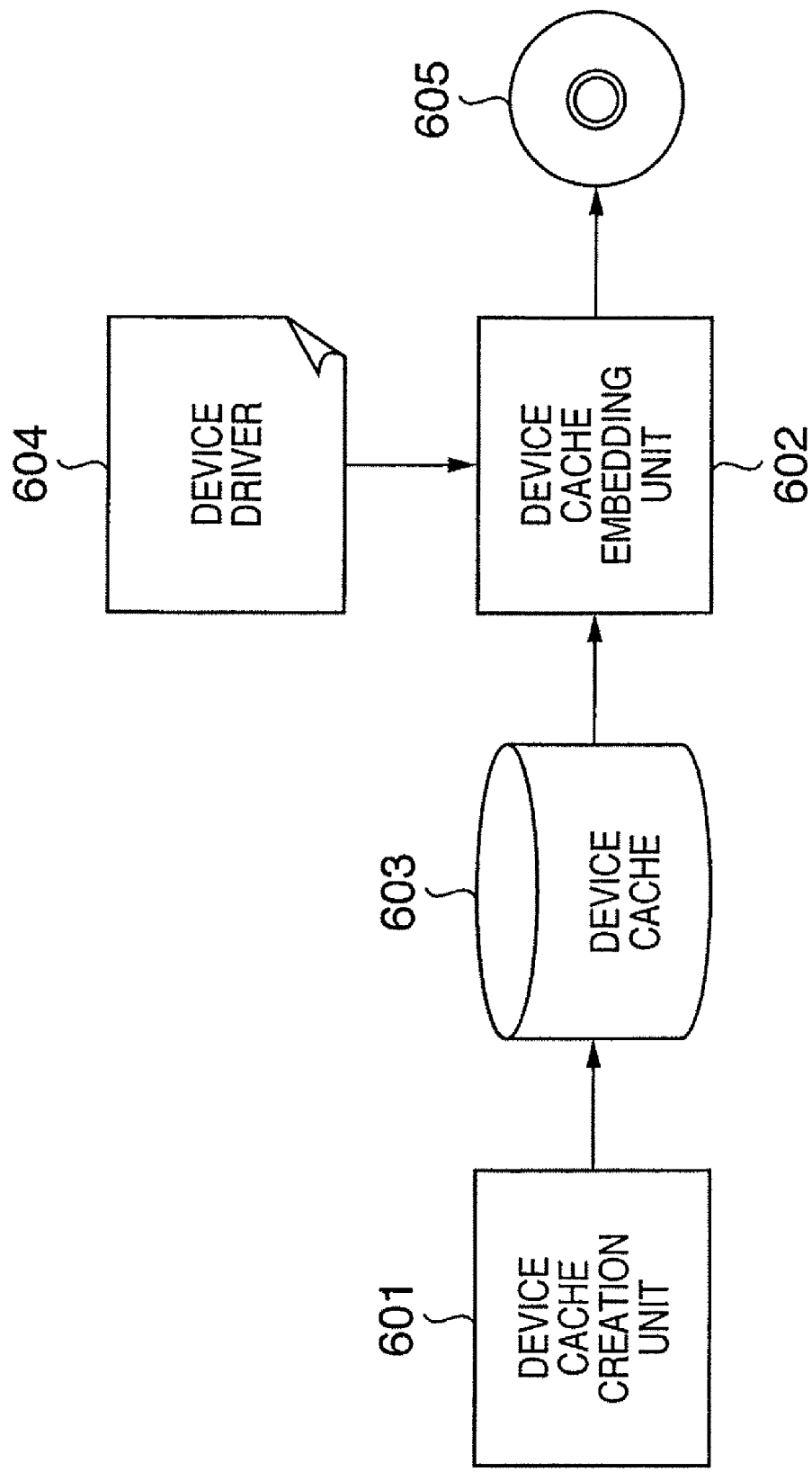
FIG. 6 is a diagram for explaining an installation method of a device cache.

When the device vendor embeds a device cache into the device driver in advance, the device cache is installed upon installation of the device driver, thus eliminating any load on the user who creates a device cache (FIG. 6).

Referring to FIG. 6, a device cache creation unit 601 executes the processing shown in FIG. 2 to create a device cache 603. A device cache embedding unit 602 creates a device driver 605 by combining a device driver 604 and the device cache 603.

Figure 7:
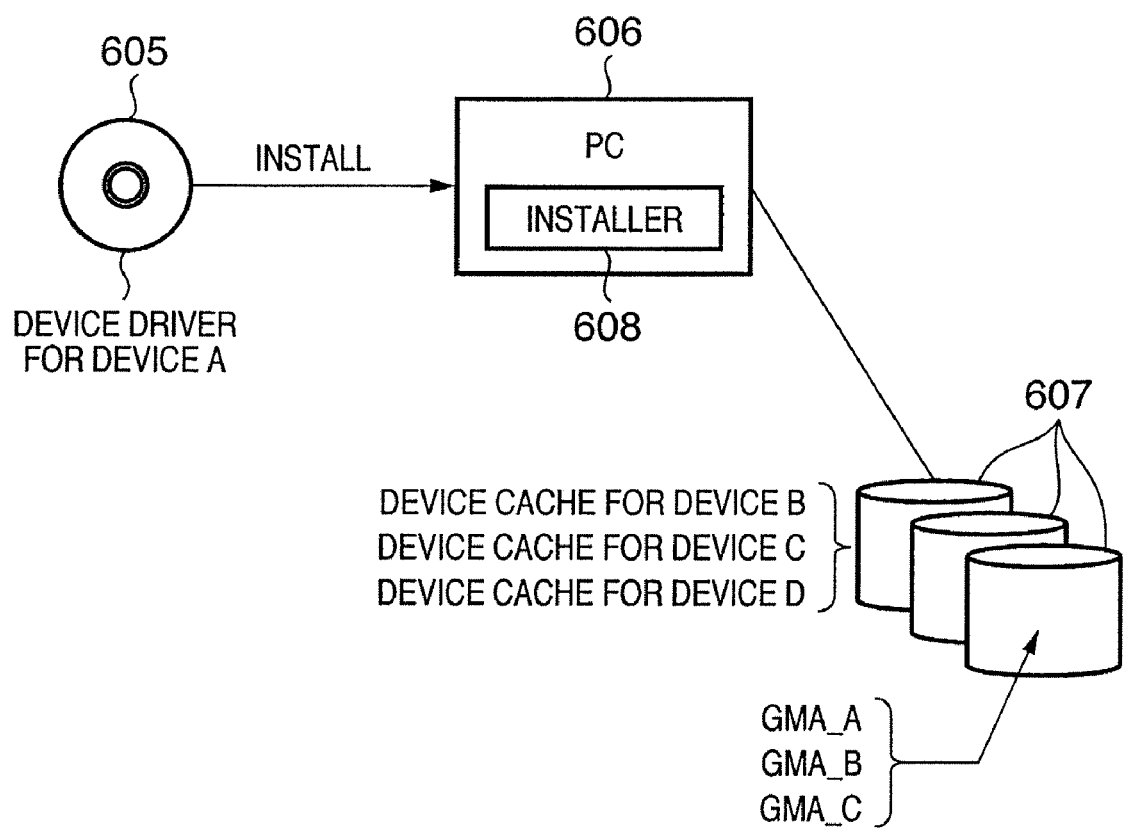
FIG. 7 is a view for explaining installation of a device driver.

FIG. 7 shows a state wherein the device driver 605 including a device cache for device A is to be installed in a computer (PC) 606. In this case, assume that device caches and GMAs for other devices have already been stored in a memory 607 of the PC 606. An installer 608 displays a user interface shown in FIG. 8 to inquire the user about how to create a system cache. If a system (color conversion system) which is to undergo color management is determined, the user can create a system cache at the time of installation using the user interface shown in FIG. 8.

Figure 8:
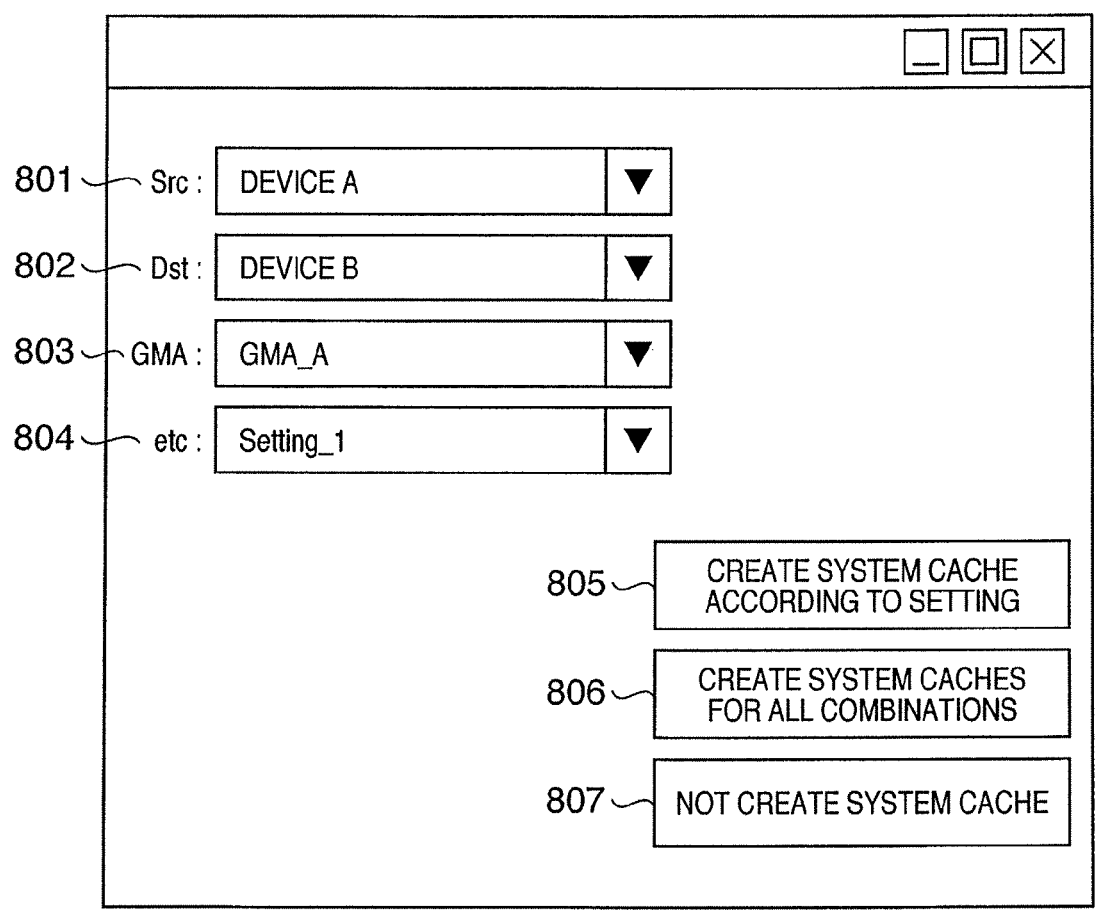
FIG. 8 shows an example of a user interface used to create a system cache.

The user uses a menu box 801 shown in FIG. 8 to designate a source device (Src) for which a system cache is to be created. Likewise, a menu box 802 is used to designate a destination device (Dst), a menu box 803 is used to designate a GMA, and a menu box 804 is used to designate miscellaneous setting information. The menu box 804 is used to designate, e.g., black preservation or the like. Note that the menu box 801 or 802 used to designate a device is permanently assigned to a device corresponding to the device driver to be installed at that time. If there are a plurality of devices corresponding to the device driver to be installed, one of these devices can be selected.

For example, upon installing a printer driver, since a printer is an output device, the menu box 802 is assigned to the printer corresponding to the driver to be installed. On the other hand, the menu box 801 displays a list box of device caches for other devices held in the PC 606. Likewise, the menu box 803 displays a list box of GMAs held in the PC 606. Note that the installer 608 detects the device caches and GMAs saved in the PC 606 by executing retrieval processing in the PC 606.

When the user presses a system cache creation button 805, the installer 608 creates a system cache corresponding to the conditions set using the menu boxes 801 to 804 (i.e., that for a given color conversion system).

On the other hand, when the user presses a system cache creation button 806, the installer 608 creates system caches for all combinations which can be set using the menu boxes 801 to 804. However, a device corresponding to the menu box 801 or 802 is one or a plurality of devices corresponding to the device driver to be installed at that time.

When the user presses a cancel button 807, the installer 608 skips creation of a system cache. In this case, a system cache is created at another timing. For example, a system cache is created when color matching processing is applied to an input image.

Figure 9:
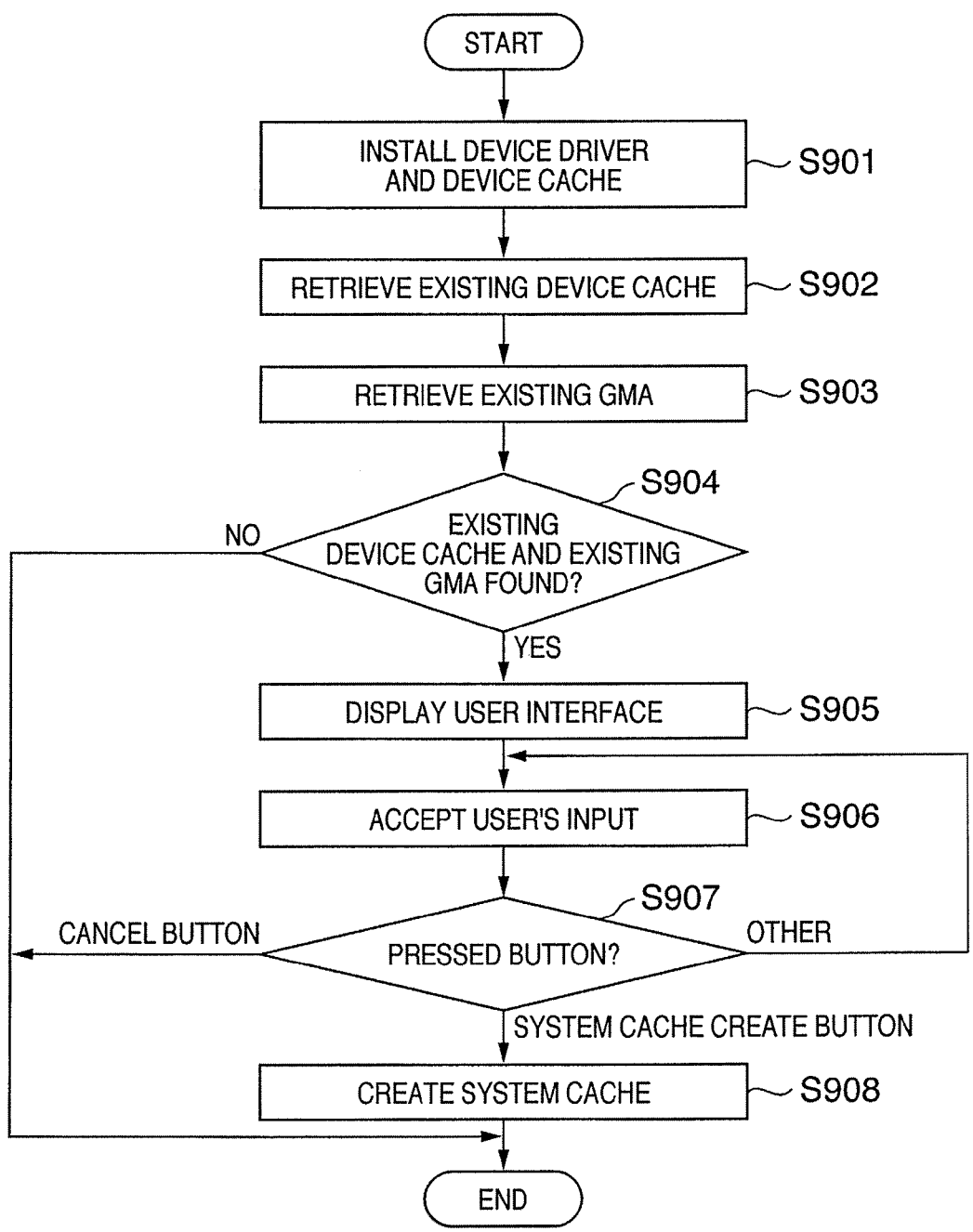
FIG. 9 is a flowchart showing processing to be executed by an installer of a device driver.

FIG. 9 is a flowchart showing the processing to be executed by the installer 608. Note that the installer 608 is executed by a CPU of the PC 606.

The installer 608 installs the device driver 605 and device cache in a predetermined area of the memory 607 (e.g., a hard disk or the like) of the PC 606 (S901). The installer 608 checks the memory 607 to retrieve existing device caches (S902) and existing GMAs (S903). The installer 608 checks if the existing device caches and existing GMAs are found (S904). If either the existing device caches or existing GMAs are not found, the processing ends.

If the existing device caches and existing GMAs are found, the installer 608 displays the user interface shown in FIG. 8 (S905). The installer 608 accepts user's inputs (S906) until it is determined in step S907 that one of the buttons 805 to 807 is pressed.

If the user presses the cancel button 807, the installer 608 ends the processing. If the user presses the system cache creation button 805 or 806, it creates a system cache, and stores it in a predetermined area of the memory 607 (S908), thus ending the processing.

Figure 10:
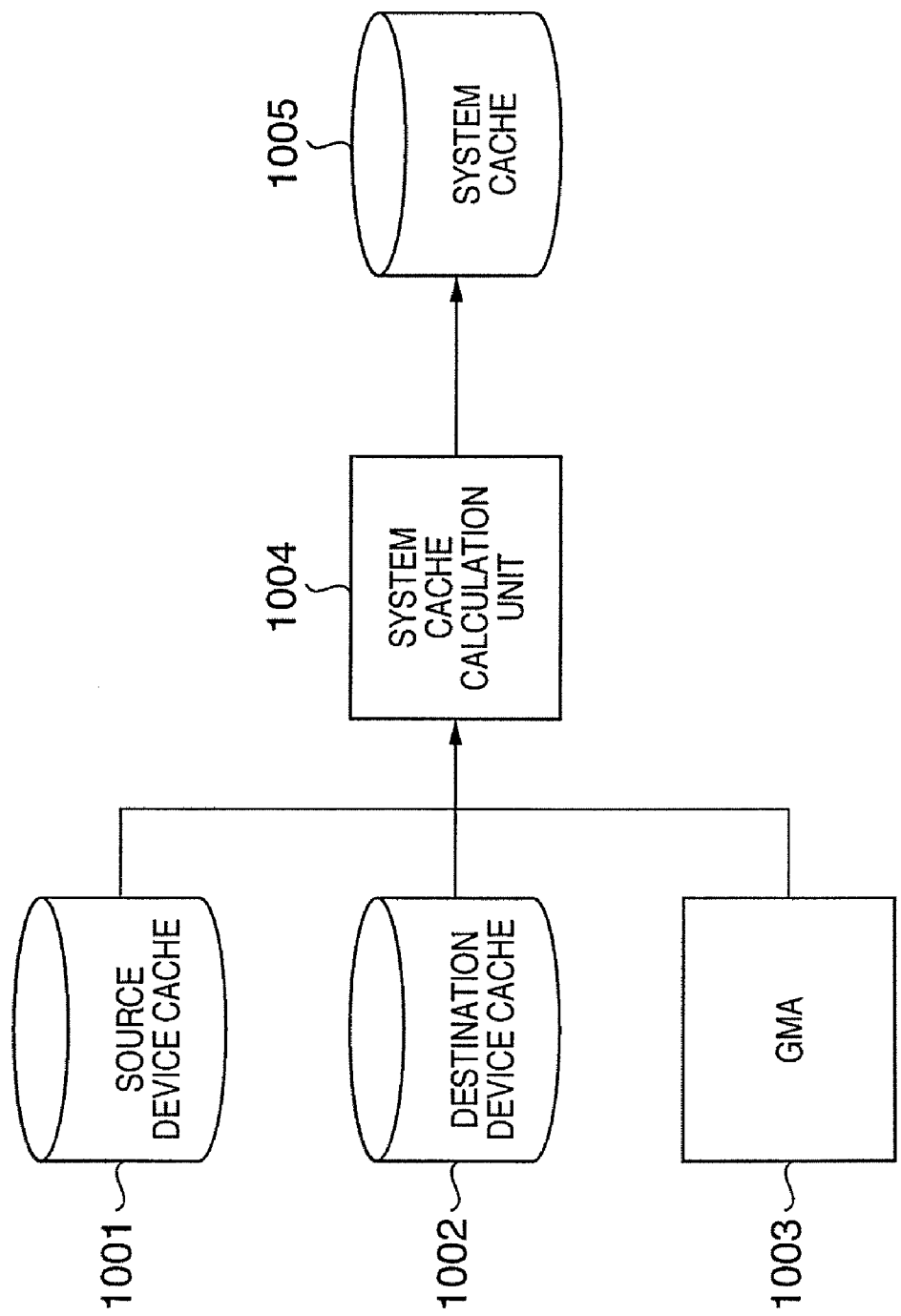
FIG. 10 is a diagram for explaining system cache creation processing.

FIG. 10 is a diagram for explaining the system cache creation processing.

A system cache calculation unit 1004 as a part of the installer 608 extracts device caches 1001 and 1002 and a GMA 1003 corresponding to the devices and GMA designated using the user interface shown in FIG. 8. The system cache calculation unit 1004 creates a system cache 1005 by integrating them.

Figure 11:
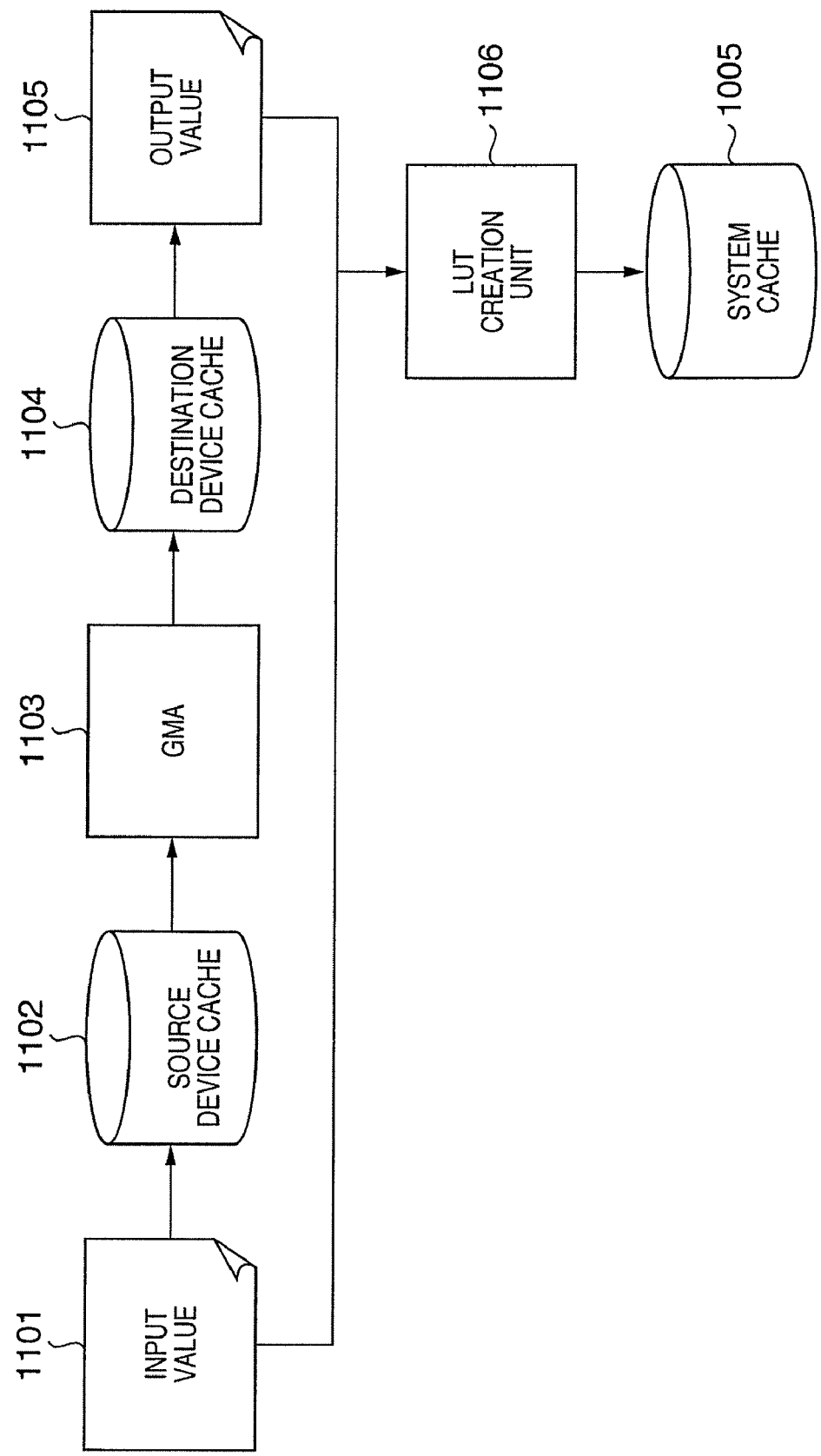
FIG. 11 is a diagram showing details of the processing of a system cache calculation unit.

FIG. 11 is a diagram showing details of the processing of the system cache calculation unit 1004.

Device values of a source device are evenly divided into 9×9×9 grids or 17×17×17 grids to create device values (input values) 1101 corresponding to grid points. This input value 1101 is input to a source device cache 1102 and is converted into, e.g., an XYZ value. The XYZ value is mapped on the gamut of a destination device using a GMA 1103. Furthermore, the mapped XYZ value is input to a destination device cache 1104 to obtain an output value 1105.

An LUT creation unit 1106 creates a table that describes the relationship between the output values 1105 obtained in this way, and the grid points (input values 1101), and outputs it as the system cache 1005.

Note that the mode and creation method of the system cache 1005 described above are merely examples, and are not particularly limited.

The installer 608 can use other device caches and GMAs in addition to those stored in the memory 607 of the PC 606 upon creating the system cache 1005. For example, device caches and GMAs held by a server on a network to which the PC 606 is connected can be used.

In this manner, the device cache is installed upon installation of the device driver 605, and when existing device caches and GMAs are found, they are combined to create the system cache 1005. Therefore, user's labor required to create the device caches can be saved. Further, the system cache 1005 is created in the color matching processing, thus increase of the time required for the color conversion processing is prevented.

[Upon Uninstallation of Device Driver]

In the above example, the device cache is installed, and the system cache 1005 is created upon installation of the device driver 605. Conversely, upon uninstallation of the device driver 605, the device caches and system cache 1005 associated with the device supported by the device driver 605 to be uninstalled are deleted.

Figure 15:
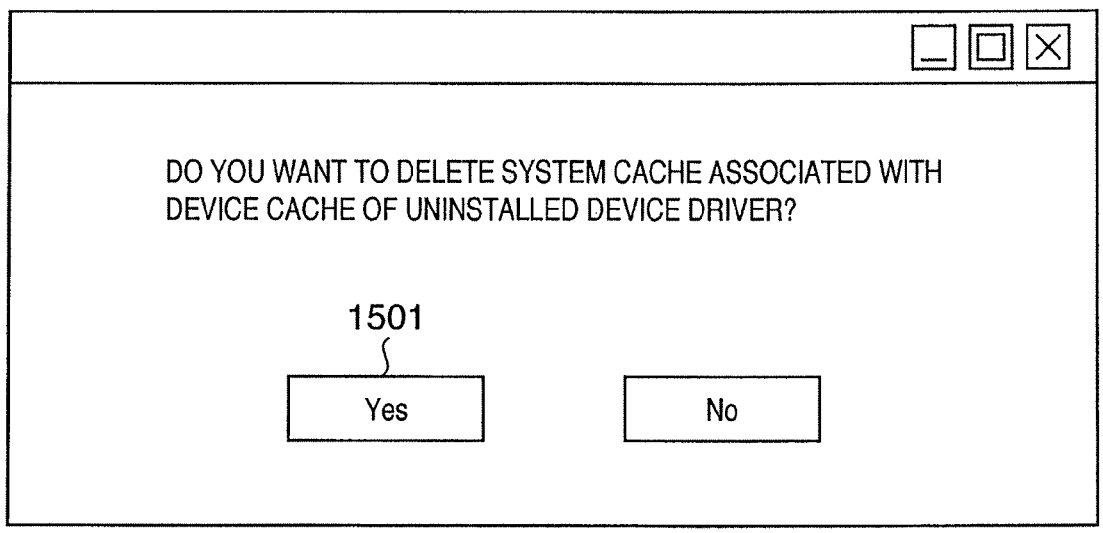
FIG. 15 shows a dialog displayed by an uninstaller of a device driver.

FIG. 15 shows a dialog displayed by the installer 608. Note that the installer 608 executes not only the installation processing but also uninstallation processing.

When the user presses a "YES" button 1501 on the dialog shown in FIG. 15, the installer 608 deletes the associated device caches and the system cache 1005 created based on the associated device caches. Of course, when the user presses a "NO" button, the installer 608 ends processing without deleting the device caches and system cache 1005.

It is very difficult for the user to check the memory of the PC 606 and to delete the unwanted device caches and system cache 1005. When the associated device caches and system cache 1005 are deleted in response to deletion of the device driver 605, the unwanted device caches and system cache 1005 can be surely deleted without exerting any load on the user. Therefore, the device caches and system cache, the corresponding device driver of which has been deleted, can be prevented from remaining saved in the memory 607 of the PC 606, thus allowing effective use of the memory resources.

Second Embodiment

Installation processing according to the second embodiment will be described hereinafter. Note that the same reference numerals in the second embodiment denote the same parts as in the first embodiment, and a detailed description thereof will be omitted.

A raster image processor (RIP) system will be described below as an example of a color management system (CMS). However, any other CMSs may be used as long as the system can determine a color conversion system before color conversion.

FIG. 12 is a diagram showing the arrangement of the RIP system which performs color management.

Clients 1201 to 1203 send image data which are described in a page description language (PDL) and the like to an RIP server 1204 to instruct to output images. The RIP server 1204 is connected to a printer 1205. Upon reception of image data from one of the clients 1201 to 1203, the RIP server 1204 executes processing such as RIP, color conversion, and the like, and outputs a print job to the printer 1205. Note that the clients 1201 to 1203, RIP server 1204, and printer 1205 respectively have network interfaces, and are connected to a network via a HUB 1206.

In the RIP server 1204, device drivers and device caches are installed in the sequence explained in the first embodiment, and a system cache is created as needed.

Figure 13:
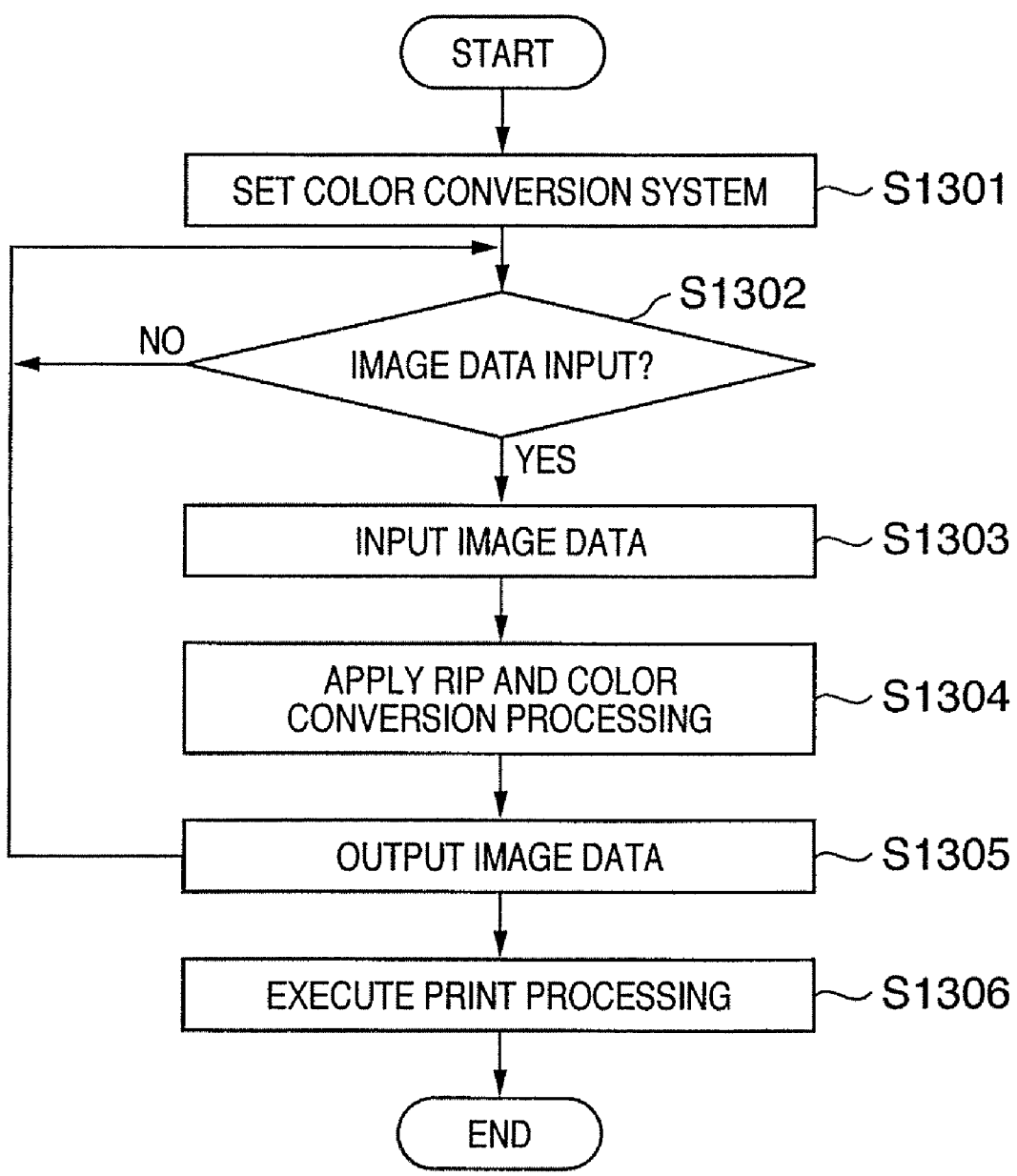
FIG. 13 is a flowchart showing the processing of an RIP server.

FIG. 13 is a flowchart showing the processing of the RIP server 1204.

A color conversion system is set (S1301). This setting can be made anywhere from the clients 1201 to 1203, and the RIP server 1204.

Figure 14:
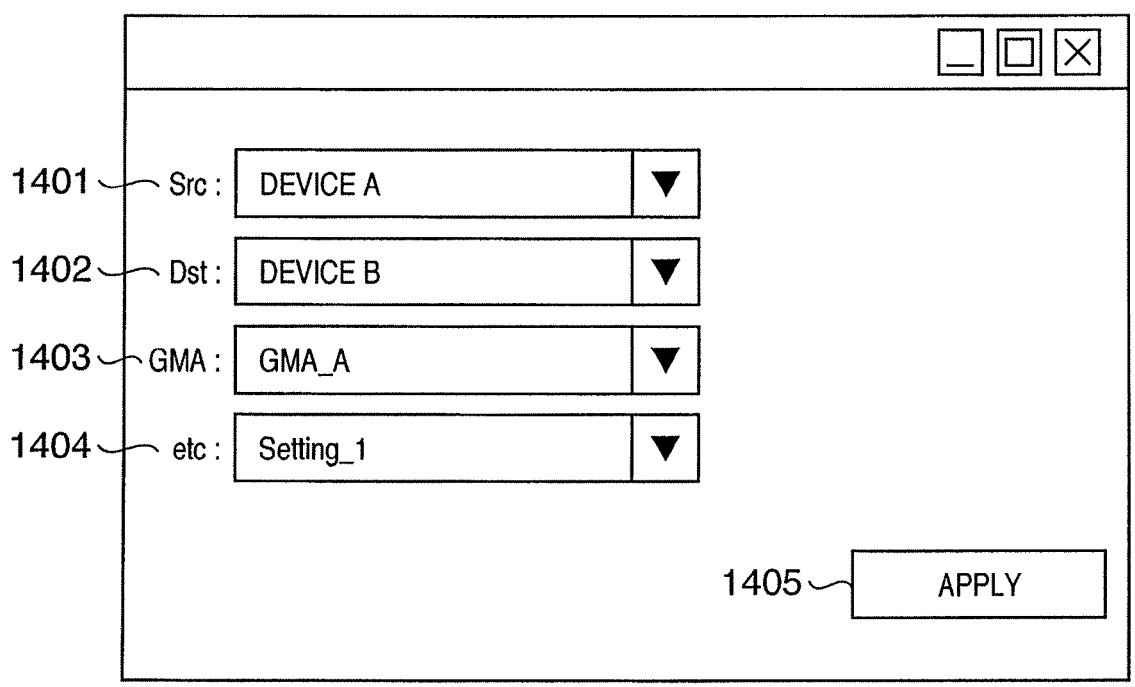
FIG. 14 shows an example of a user interface used to set a color conversion system.

FIG. 14 shows an example of a user interface used to set the color conversion system. As in the user interface shown in FIG. 8, the user interface shown in FIG. 14 comprises menu boxes 1401 to 1404 used to designate a source device (Src), destination device (Dst), GMA, and miscellaneous setting information. When the user presses an apply button 1405, the color conversion system is determined.

Note that FIG. 14 shows the user interface which can set only one color conversion system. Alternatively, a user interface which sets color conversion systems for respective objects or for respective clients may be used.

The RIP server 1204 waits for input of image data (S1302). Upon input of image data (S1303), the RIP server 1204 applies RIP processing to the image data, and executes color conversion processing using the system cache corresponding to the settings of the color conversion system (S1304). The RIP server 1204 outputs the color-converted image data to print processing (S1305), and then waits for input of the next image data (S1302). The print processing outputs the image data to the printer 1205 to control it to print that image data (S1306).

If no system cache corresponding to the set color conversion system is found in step S1304, the RIP server 1204 creates a system cache by integrating the device caches of the set devices and GMA. The RIP server 1204 executes color conversion processing using the created system cache, and stores the created system cache in a memory such as a hard disk or the like.

When the RIP serer 1204 creates the system cache, it can use other device caches and GMAs in addition to those stored in its own memory such as a hard disk or the like. For example, the RIP server 1204 can use device caches and GMAs held by the clients 1201 to 1203 and other servers.

When the color conversion system is determined in the RIP system, the color conversion processing is executed using the system cache. If no system cache corresponding to the set color conversion system is available, the system cache is created to execute the color conversion processing. Therefore, at least after creation of the system cache, the processing time of the color conversion processing can be greatly reduced. Note that this embodiment is effective not only for the RIP system but also for any other image processing systems in which the color conversion system is determined before the color conversion processing.

Modification of the Above Embodiments

In the descriptions of the first and second embodiments, the device cache is saved upon installing the device driver. However, saving of the device cache may use other methods. For example, an application which creates a device cache may create a device cache, and may save it in a computer. In this case, upon saving the device cache, the user interface shown in FIG. 8 is displayed, and the processes in steps S902 to S908 shown in FIG. 9 are executed.

Likewise, deletion of the system cache upon deleting the device caches can be applied not only to a case wherein the device driver is to be deleted, but also a case wherein the device cache is to be deleted. For example, when the device cache is to be deleted in accordance with a user's instruction, the system cache associated with the device cache to be deleted may be retrieved and deleted.

In the descriptions of the first and second embodiments, the source device cache 301, the conversion characteristics of the gamut mapping unit 102 with the specific GMA, and the destination device cache 303 are integrated. However, these embodiments can also be applied to other cases. For example, the above embodiments can be applied to a case wherein the conversion characteristics of the gamut mapping unit 102 and the source device cache 301 or the destination device cache 303 are to be integrated. Also, the above embodiments can be applied to a case wherein the device cache and other color conversion data such as color adjustment and the like are to be integrated.

Third Embodiment

Color processing according to the third embodiment will be described hereinafter.

Figure 16:
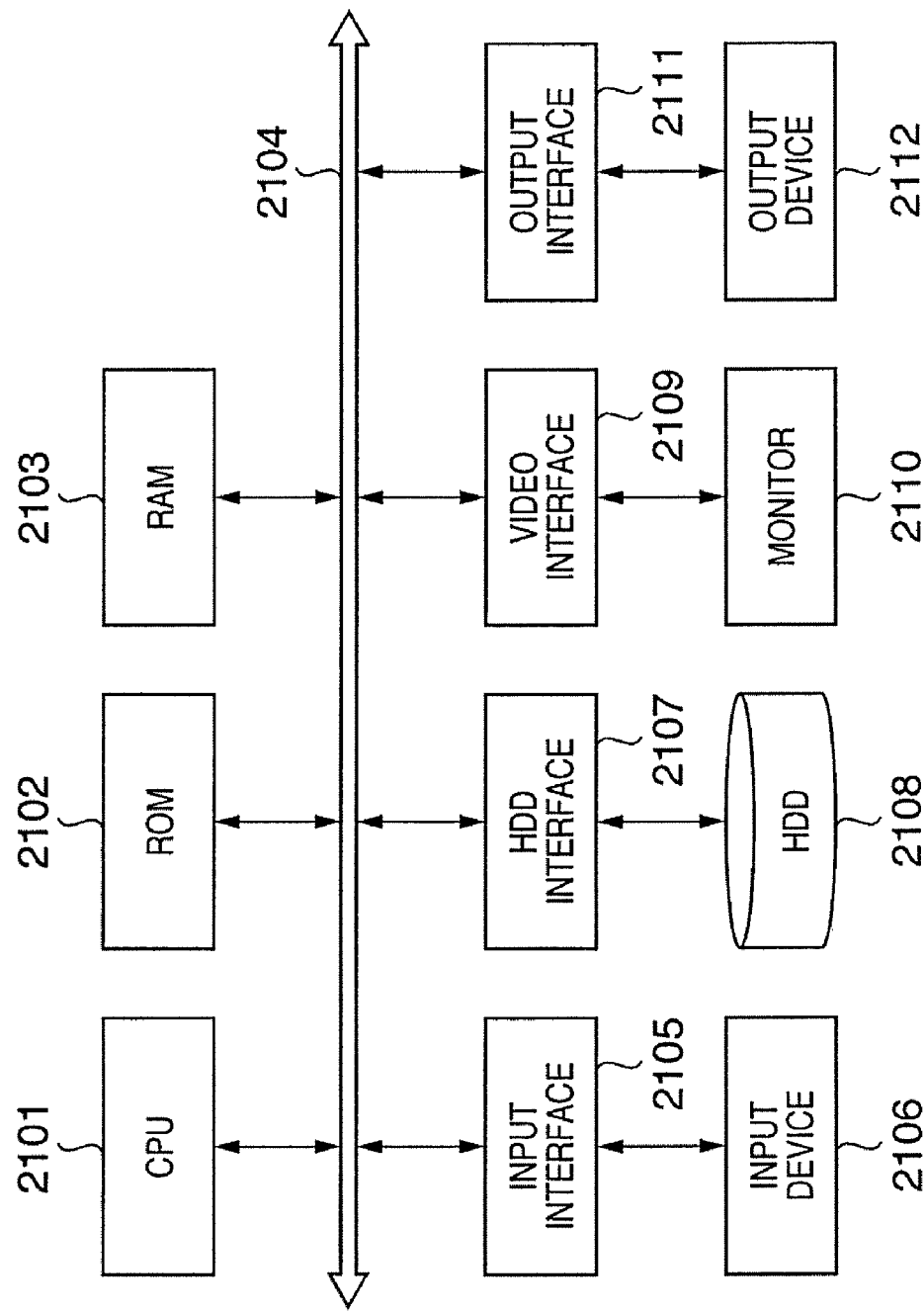
FIG. 16 is a block diagram showing the arrangement of an image processing apparatus according to the third embodiment.

FIG. 16 is a block diagram showing the arrangement of an image processing apparatus of the third embodiment.

A CPU 2101 executes programs stored in a ROM 2102 and hard disk drive (HDD) 2108 using a RAM 2103 as a work memory. The CPU 2101 controls respective components to be described below via a system bus 2104, thus executing various kinds of processing including color processing to be described later.

An input interface 2105 comprises a serial bus interface such as USB, IEEE1394, or the like, which connects an input device 2106 that includes a keyboard, mouse, digital camera, scanner, and the like. The CPU 2101 can load data from the input device 2106 via the input interface 2105. Note that the CPU 2101 can also load device information unique to the input device 2106 such as a model name, gamut information, and the like of a digital camera.

An HDD interface 2107 comprises an interface such as serial ATA (SATA) or the like, which connects a secondary storage device such as the HDD 2108, an optical disk drive, or the like. The CPU 2101 reads out data from the HDD 2108, and can write data in the HDD 2108 via the HDD interface 2107. Furthermore, the CPU 2101 can store data stored in the HDD 2108 in the RAM 2103, and can similarly store data stored in the RAM 2103 in the HDD 2108. The CPU 2101 can postulate data which are read out from the HDD 2108 and are stored in the RAM 2103 as programs, and can execute them.

A video interface 2109 comprises an interface that connects a monitor 2110. The CPU 2101 can control the video interface 2109 to display arbitrary characters and images on the monitor 2110.

An output interface 2111 comprises a serial bus interface such as USB, IEEE1394, or the like, which connects an output device 2112 such as a printer, plotter, film recorder, or the like. The CPU 2101 sends data to the output device 2112 via the output interface 2111 to print or record the data. As in the input device 2106, the CPU 2101 can read device information unique to the output device 2112 such as a model name, gamut information, and the like of the output device 2112. By utilizing a two-way communication interface such as USB, IEEE1394, or the like, the input interface 2105 and output interface 2111 can be combined into one interface.

[Functional Arrangement]

Figure 17:
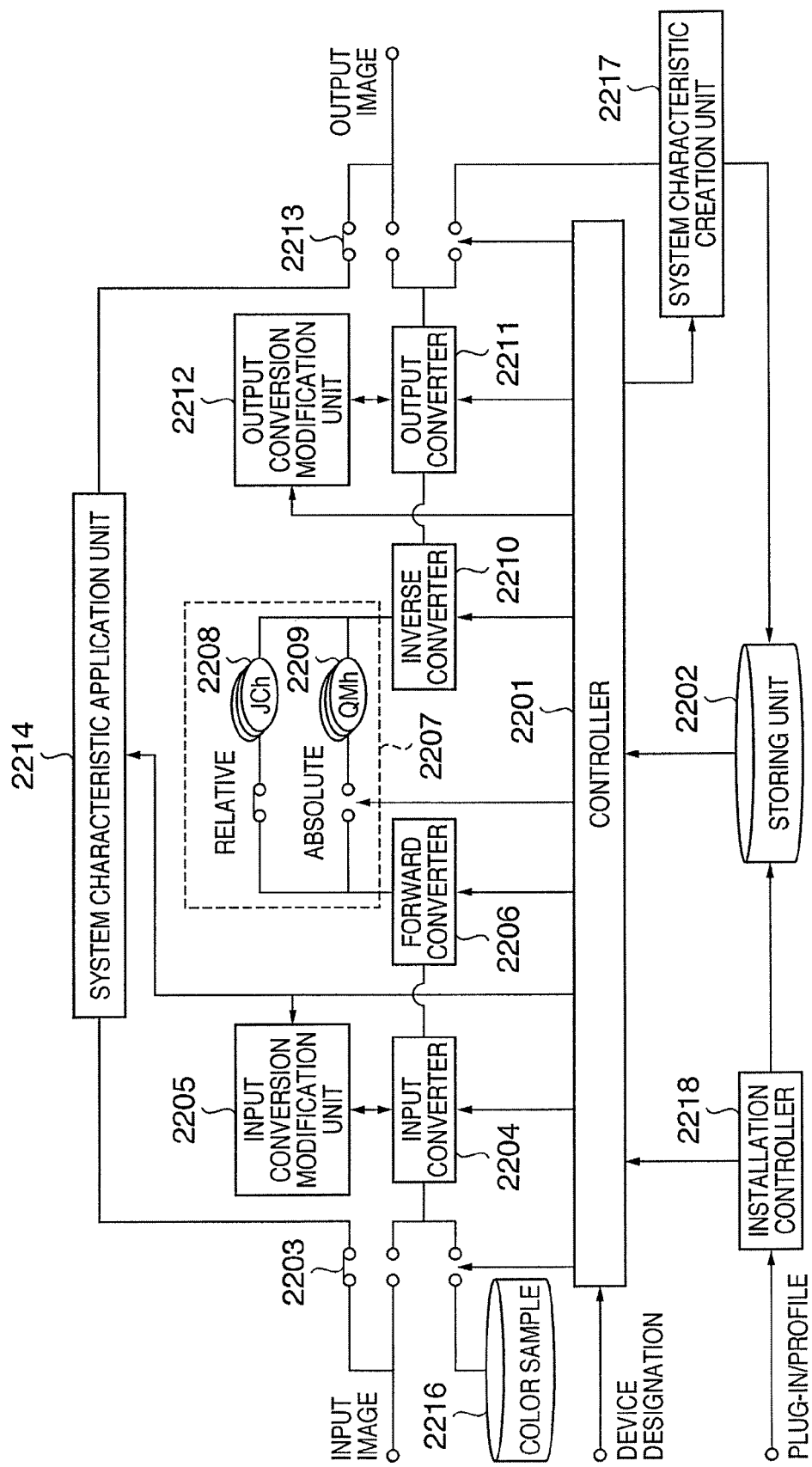
FIG. 17 is a block diagram showing the functional arrangement of the image processing apparatus.

FIG. 17 is a block diagram showing the functional arrangement of the image processing apparatus, and shows the functional arrangement implemented when the CPU 2101 executes programs.

The functional arrangement shown in FIG. 17 can be roughly classified into an input converter 2204, forward converter 2206, inverse converter 2210, gamut mapping unit 2207, and output converter 2211. An input image is converted into an output image via these functional units.

The input converter 2204 and output converter 2211 create color conversion data from data indicating the color reproduction characteristics of devices, and execute color conversion processing using the created color conversion data. In order to improve the processing speed, the created color conversion data (parameters to be given to conversion models and conversion characteristic LUTs) are stored (cached) in a storing unit 2202.

Likewise, the forward converter 2206, gamut mapping unit 2207, and inverse converter 2210 create conversion characteristic LUTs, and cache them in the storing unit 2202.

In order to further improve the processing speed, an integrated conversion characteristic LUT obtained by integrating the LUTs of the input converter 2204, output converter 2211, forward converter 2206, gamut mapping unit 2207, and inverse converter 2210 is created, and is cached in the storing unit 2202. The integrated conversion characteristic LUT can be created by storing the processing results of data corresponding to grid points of an LUT recorded in a color sample 2216 by the input converter 2204, output converter 2211, forward converter 2206, gamut mapping unit 2207, and inverse converter 2210 in the LUT. A system characteristic application unit 2214 executes color conversion by reading out this integrated conversion characteristic LUT (cache data).

An installation controller 2218 updates control tables 1301 (to be described later) stored in the storing unit 2202 by storing plug-ins and profiles (to be described later) in the storing unit 2202.

[Modification of Cache Data]

In general, an output device such as a printer or the like suffers color reproducibility variations due to changes in temperature, humidity, and the like. The cache data must be created again every time components such as input and output devices, GMAs, and the like of a color matching workflow have changed. Also, the color reproducibility of an output image can be changed by replacing modules of the input converter 2204, output converter 2211, forward converter 2206, gamut mapping unit 2207, and inverse converter 2210, and the cache data. Such replacement can change the color reproducibility but does not suffice to adjust local color reproducibility. Upon updating the cached conversion data, it is inefficient to generate the conversion data and conversion characteristic LUTs of respective processes from the beginning since data which need not be updated must also be re-calculated.

Hence, in order to efficiently make adjustment according to a change in color reproducibility of the output device or color reproducibility adjustment of an output image, the image processing apparatus of the third embodiment has a function of generating modification LUTs for the input conversion characteristic LUT and output conversion characteristic LUT in accordance with a user's instruction.

An input conversion modification unit 2205 creates modification data of the input conversion characteristic data. An output conversion modification unit 2212 creates modification data of the output conversion characteristic data.

Figure 18:
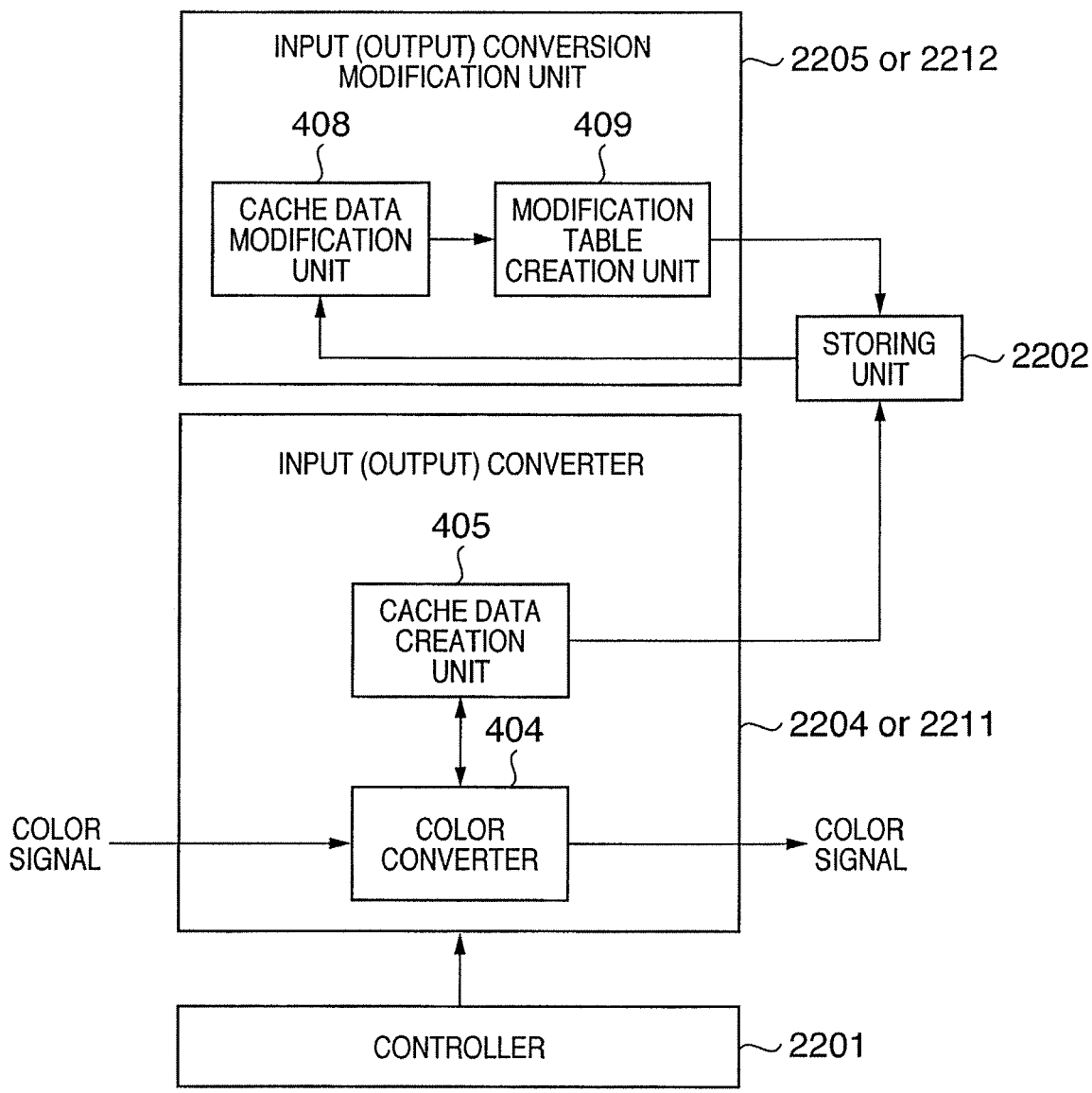
FIG. 18 is a diagram showing the relationship between an input converter or output converter, and an input conversion modification unit or output conversion modification unit.

FIG. 18 is a diagram showing the relationship between the input converter 2204 or output converter 2211, and the input conversion modification unit 2205 or output conversion modification unit 2212.

A color converter 404 performs color conversion using color conversion data created by a cache data creation unit 405. The cache data creation unit 405 creates the color conversion data from data indicating the color reproduction characteristics of a device. The data indicating the color reproduction characteristics of a device indicates the correspondence between device data used to output a plurality of color patches and calorimetric data of the output color patches in case of, e.g., an output device, as explained with reference to FIG. 2. Likewise, in case of an input device, the data indicating the color reproduction characteristics of a device indicates the correspondence between the calorimetric values of standard color patches, and device data obtained by inputting the standard color patches using the input device.

Figure 19:
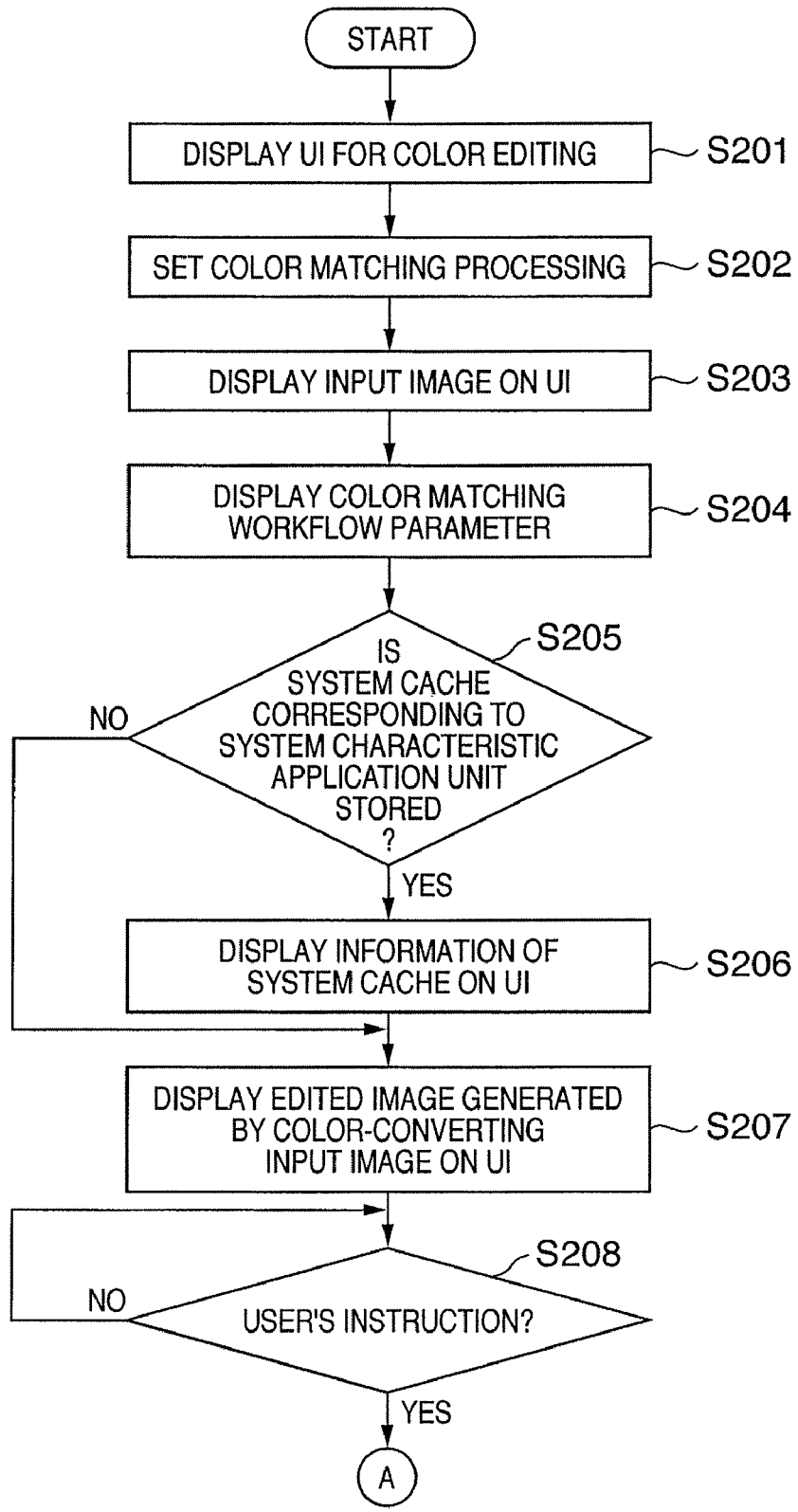
FIGS. 19 and 20 are flowcharts showing cache data modification processing.
Figure 20:
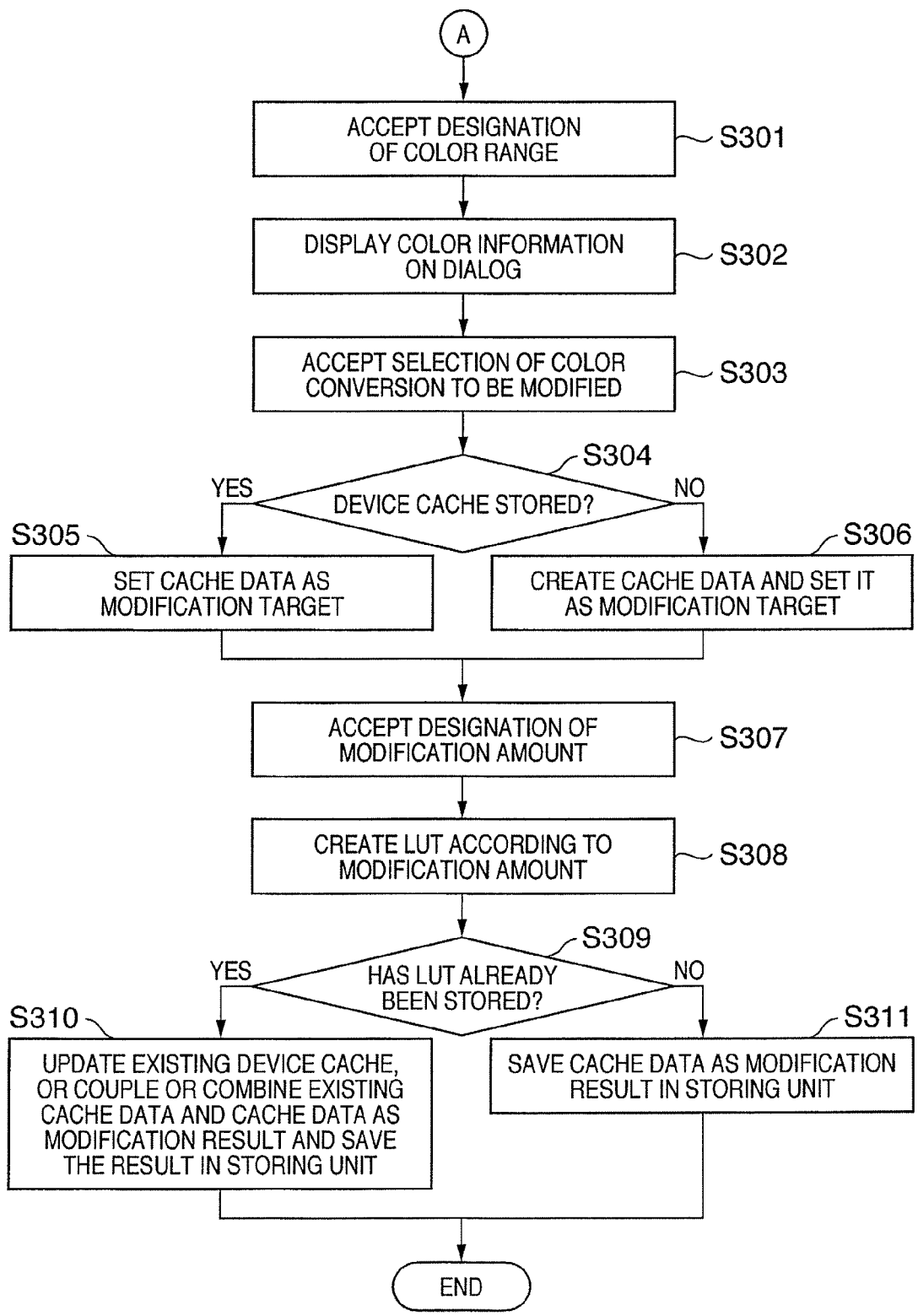
Figure 23:
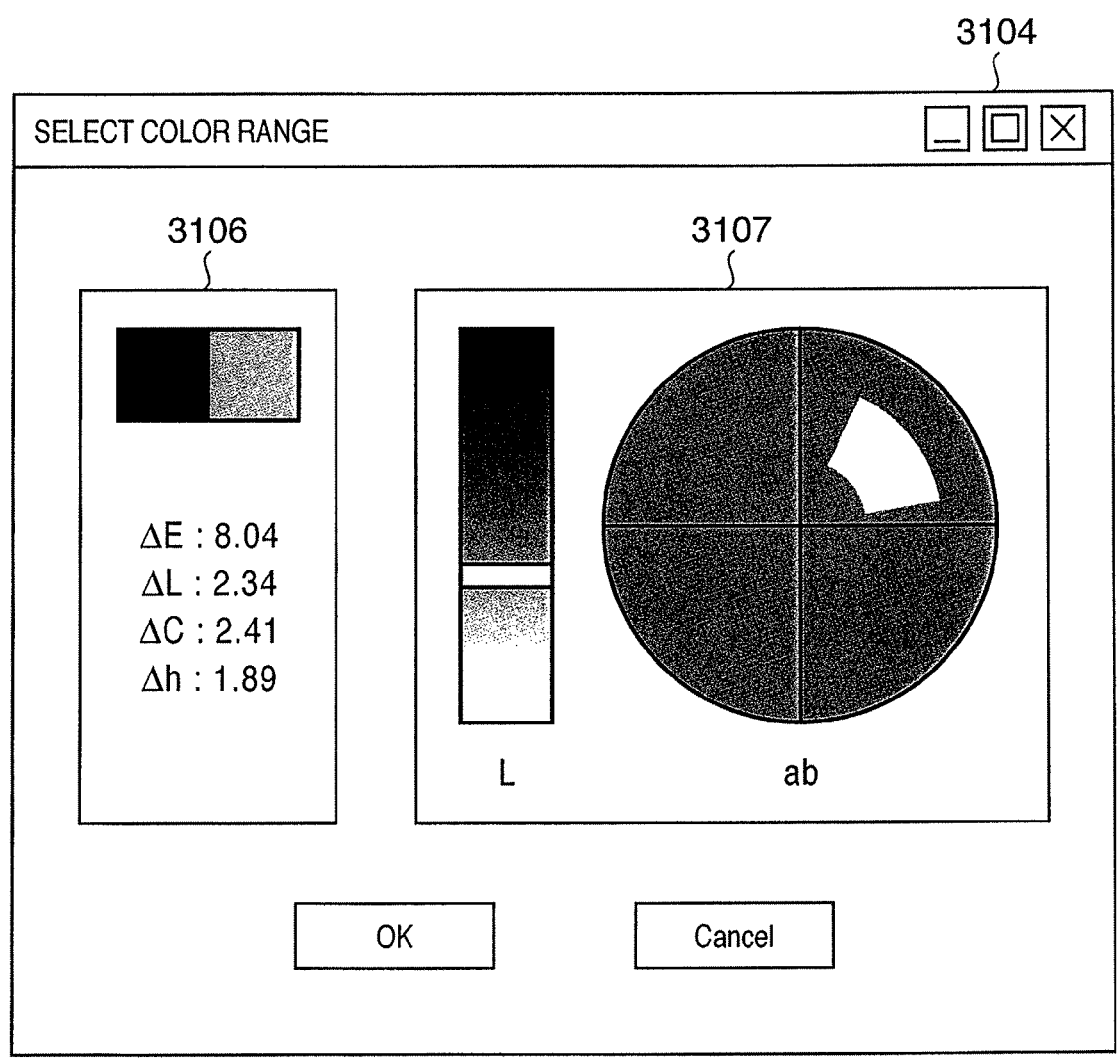
FIG. 23 shows an example of a color range setting dialog.

The input conversion modification unit 2205 or output conversion modification unit 2212 controls a modification table creation unit 409 to execute processing described in FIGS. 19 and 20. The modification table creation unit 409 creates a modification LUT which is modification data for the input or output conversion characteristic LUT and that according to color adjustment conditions designated on user interfaces shown in FIGS. 23 and 24. The unit 409 stores the created modification LUT in the storing unit 2202.

Figure 27:
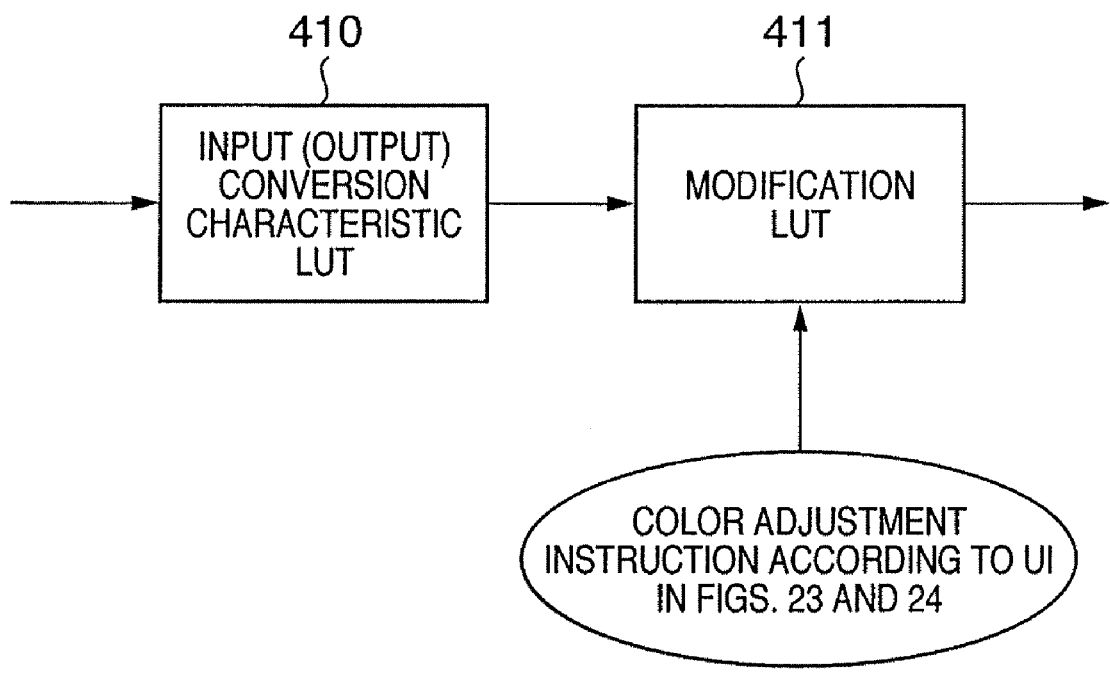
FIG. 27 is a view for explaining the relationship between an input or output conversion characteristic LUT and modification LUT.

FIG. 27 is a diagram for explaining the relationship between the input or output conversion characteristic LUT and modification LUT.

The third embodiment does not modify a conversion characteristic LUT 410 itself created by the cache data creation unit 405. The third embodiment implements color adjustment according to a user's instruction by creating a modification LUT 411 which is different from the conversion characteristic LUT 410. By applying both the processes based on the conversion characteristic LUT 410 and modification LUT 411 to color data, the third embodiment can implement input or output conversion that reflects the color adjustment according to the user's instruction.

The same applies to the system characteristic application unit 2214. A controller 2201 passes various conversion parameters or conversion table information associated with the color matching workflow to a system characteristic creation unit 2217. The system characteristic creation unit 2217 applies color matching processing to data corresponding to grid points of the LUT recorded in the color sample 2216 using these conversion parameters and conversion table and stores the processing result in the LUT, thus creating an integrated conversion characteristic LUT. The unit 2217 stores the integrated conversion characteristic LUT in the storing unit 2202 as a system cache. In the subsequent processing, the system characteristic application unit 2214 reads out the system cache from the storing unit 2202 and converts input color data.

The integrated conversion characteristic LUT integrates various kinds of conversion processing associated with the color matching workflow. Therefore, when the input conversion characteristic LUT or the output conversion characteristic LUT is modified according to a user's instruction, the integrated conversion characteristic LUT is re-created and updated based on the modified conversion characteristic LUT.

FIGS. 19 and 20 are flowcharts showing the modification processing of cache data as individual and integrated conversion characteristic data. The controller 2201 executes this processing.

Figure 21:
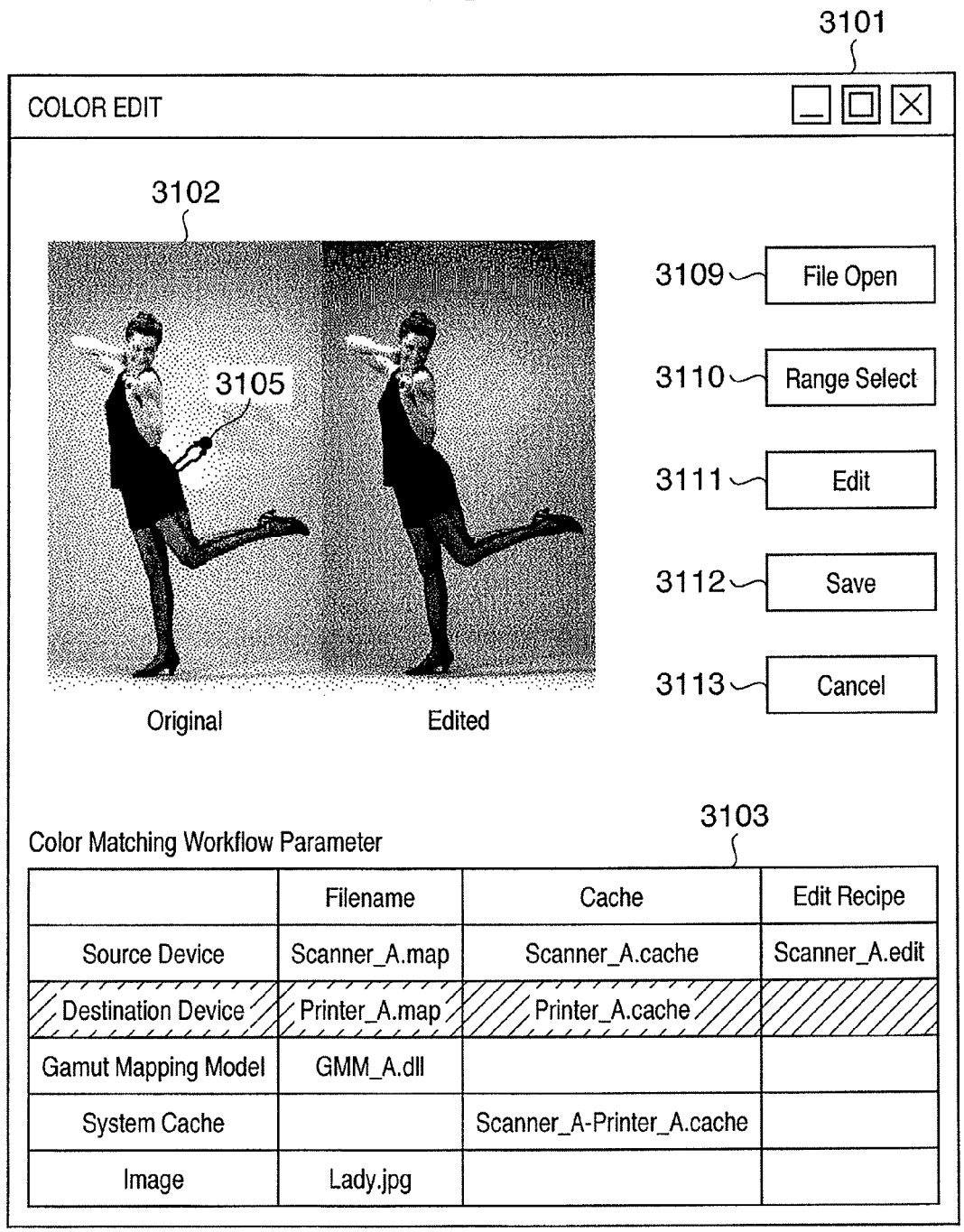
FIG. 21 shows an example of a user interface for color editing.
Figure 22:
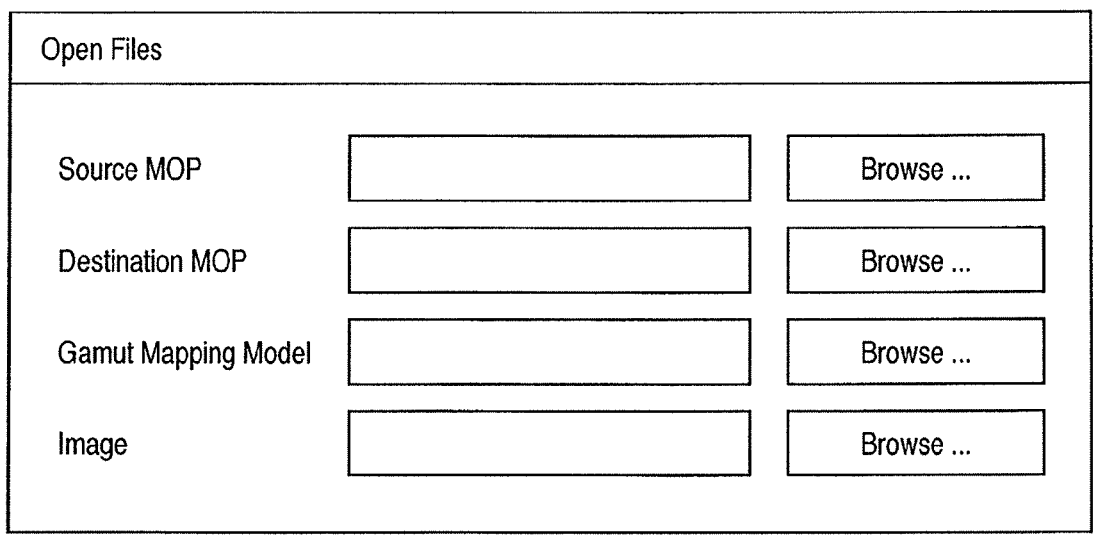
FIG. 22 shows an example of a file open dialog.

The controller 2201 displays a UI 3101 for color editing shown in FIG. 21 on the monitor 2110 (S201). When the user presses a File Open button 3109 on the UI, the controller 2201 displays a dialog shown in FIG. 22, and sets files corresponding to the processing conditions associated with color matching according to a user's instruction (S202). The corresponding files include colorimetric information (Source MOP) of an input device, colorimetric information (Destination MOP) of an output device, a gamut mapping module (Gamut Mapping Model), and an input image (Image). Note that "MOP" is an abbreviation for "measurement only profile": Source MOP indicates the color reproduction characteristics of a source device, and Destination MOP indicates those of a destination device. In step S202, other parameters such as the viewing conditions on the input and output sides and the like may also be set.

Next, the controller 2201 displays an input image 3102 on the UI 3101 (S203), and also displays information of parameters associated with the color matching processing conditions set in step S202 on a table 3103 (S204). The information to be displayed includes a file name (Filename) of a parameter, a corresponding cache data name (Cache), and a modification LUT name (Edit Recipe) if a modification LUT corresponding to the cache data is available.

Furthermore, the controller 2201 checks if the integrated conversion characteristic LUT corresponding to the set color matching processing conditions is cached (S205). If the controller 2201 determines in step S205 that the integrated conversion characteristic LUT is cached, it displays the file name of the cached integrated conversion characteristic LUT in a system cache line (System Cache) of the table 3103 (S206). If the controller 2201 determines in step S205 that the integrated conversion characteristic LUT is not cached, the flow advances to step S207.

The controller 2201 displays a converted image, which is obtained by applying color conversion to the input image 3102 according to the set color matching workflow, as an edited image on the UI 3101 next to the input image 3102 (S207). The controller 2201 then transits to a waiting state for the next user's instruction (S208).

When the user presses a Range Select button 3110 used to designate a color range on the UI 3101, the controller 2201 displays a UI used to set color adjustment conditions. Also, the controller 2201 displays a dropper icon 3105 shown in FIG. 21, displays a dialog 3104 used to set the color range shown in FIG. 23, and accepts user's designation of the color range (S301). The controller 2201 calculates information of a color of the input image 3102 designated by the dropper icon 3105 and that of an output image at the same coordinate position as that on the input image 3102 designated by the dropper icon 3105, and displays them on a window 3106 of the dialog 3104 (S302). Note that FIG. 23 exemplifies a case that displays ΔE (color difference), ΔL (lightness difference), ΔC (saturation difference), and Δh (hue difference), but other kinds of information may be displayed. If the user presses an "OK" button shown in FIG. 23, the controller 2201 ends acceptance of designation of the color range, and sets the color range.

The controller 2201 accepts a user's instruction to select a color conversion target to be modified (S303).

In the third embodiment, color conversions that the user can select as modification targets include the input conversion characteristic data (Source Device in the table 3103) and the output conversion characteristic data (Destination Device in the table 3103). By selecting a line of the modification target on the table 3103, the user selects a color conversion to be modified. FIG. 21 exemplifies a case in which the user selects the output conversion characteristic data.

Next, the controller 2201 checks if a device cache of the color conversion selected in step S303 is stored (S304). If the cache data is stored, the controller 2201 selects that cache data as a modification target (S305); otherwise, it controls the cache data creation unit 405 to create cache data and selects the created cache data as a modification target (S306).

Figure 24:
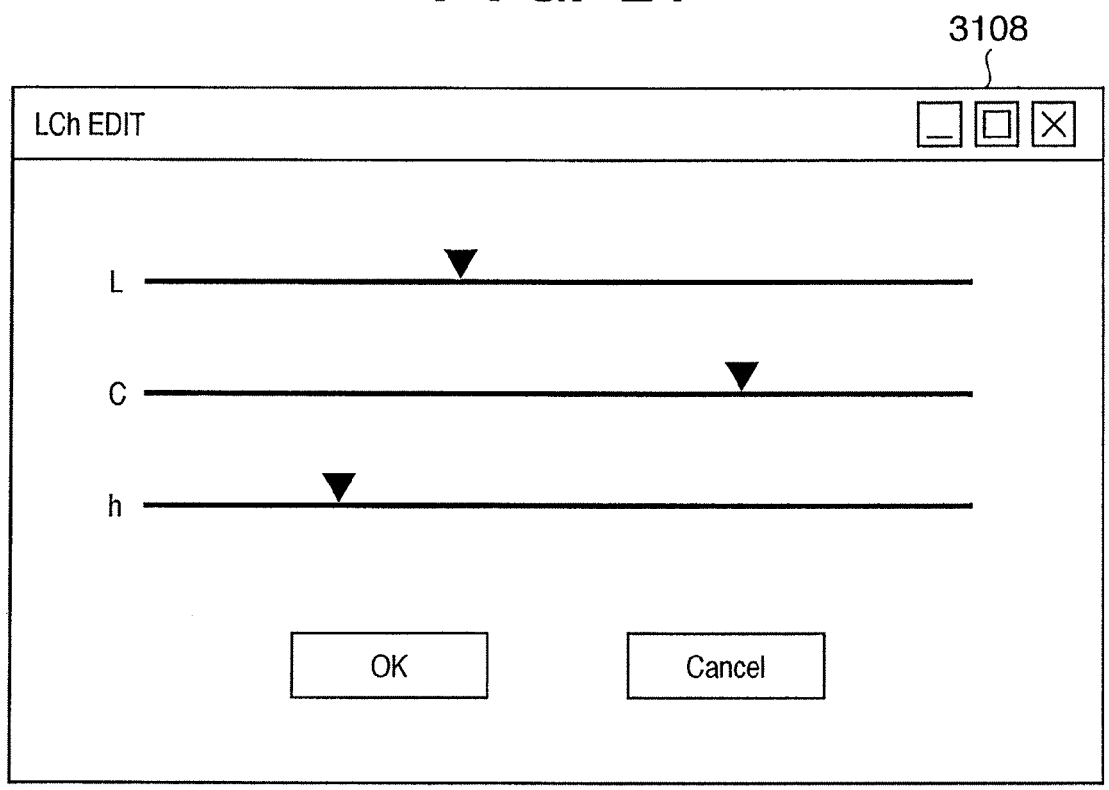
FIG. 24 shows an example of a color modification dialog.

When the user presses an Edit button 3111 on the UI 3101, the controller 2201 displays a dialog 3108 for color editing shown in FIG. 24, and accepts modification amounts of L, C, and h (S307). FIG. 24 shows a general LCh editor as a UI used to designate color modification, but other methods may be used.

When the user presses an "OK" button after he or she designates modification amounts by operating the LCh editor shown in FIG. 24, the controller 2201 creates a modification LUT used to modify a color within the designated color range in accordance with the modification amounts (S308). The modification LUT is a conversion table which outputs a converted color of an input color according to the modification amounts for the color within the designated color range, and outputs an input color intact for a color outside the designated color range.

The controller 2201 checks if a modification LUT has already been stored in correspondence with the color conversion to be modified (S309). In case of FIG. 21, the modification LUT has already been stored in correspondence with the input conversion characteristic data (Source Device). However, no modification LUT is stored in correspondence with the output conversion characteristic data (Destination Device).

If no modification LUT is stored, the controller 2201 saves the created modification LUT in the storing unit 2202 in correspondence with the color conversion to be modified (S311). On the other hand, if the modification LUT has already been stored, the controller 2201 updates the existing modification LUT. As the update method, the controller 2201 couples or combines the existing modification LUT and created modification LUT. Then, the controller 2201 saves the updated modification LUT in the storing unit 2202 in correspondence with the color conversion to be modified (S310).

Note that the control tables 1301 (to be described later) are used to manage the correspondence between the modification LUTs and color conversions to be modified.

Note that the modification LUT created by the aforementioned processing is saved in response to an instruction of a Save button 3112. Upon saving the modification LUT, re-creation and updating of the integrated conversion characteristic LUT that uses the color conversion to be modified are executed.

[Storing Unit]

Figure 25:
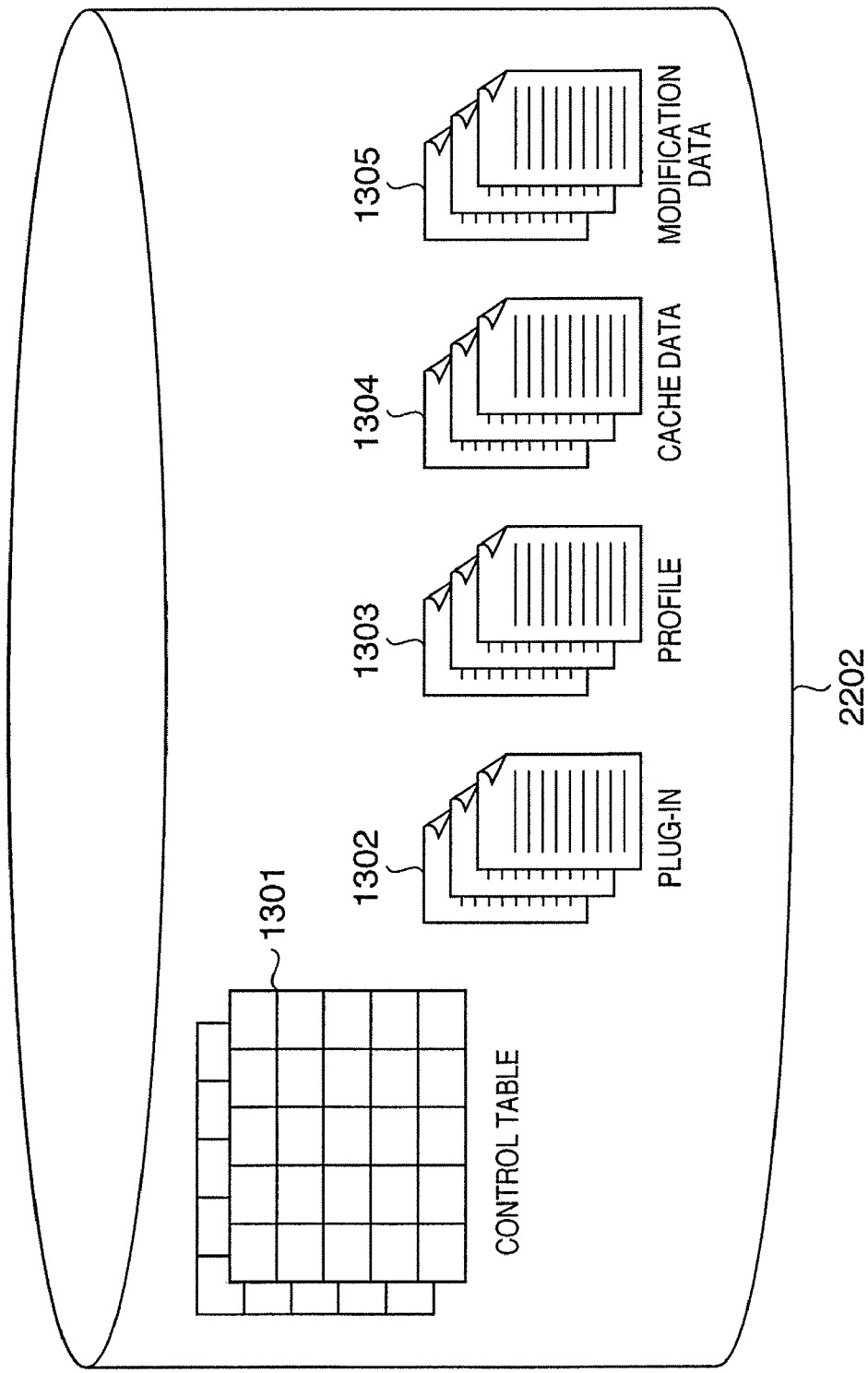
FIG. 25 shows information associated with a color matching workflow stored in a storing unit.

FIG. 25 shows information associated with the color matching workflow stored in the storing unit 2202.

The storing unit 2202 stores, as information associated with the color matching workflow, plug-ins 1302, profiles 1303, cache data 1304, and modification data 1305 as a plurality of files. Furthermore, the storing unit 2202 stores the control tables 1301 used to manage these files.

Figure 26:
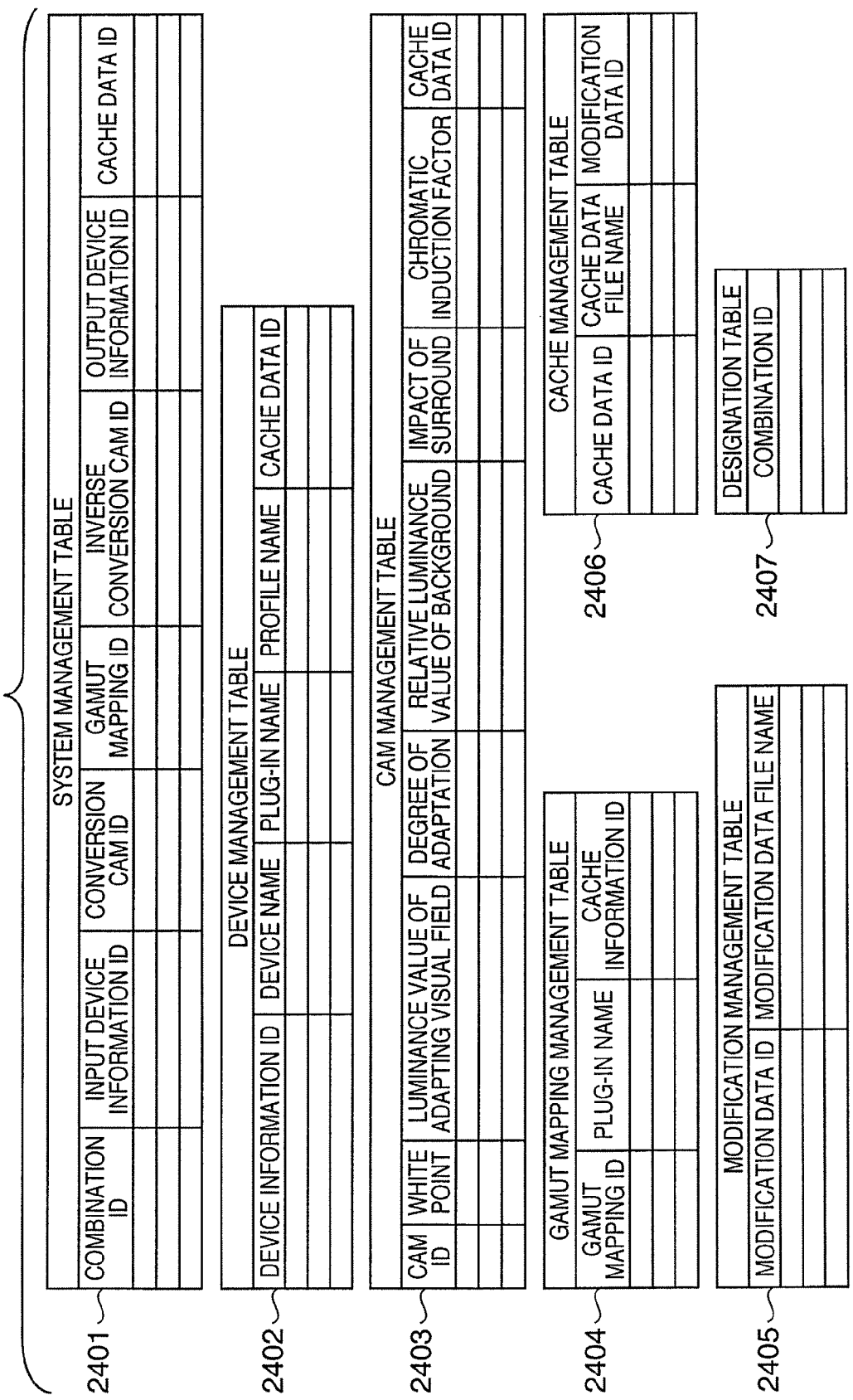
FIG. 26 shows details of a control table.

FIG. 26 shows details of the control tables 1301.

A system management table 2401 manages components of the color matching workflow. More specifically, the table 2401 stores input and output device IDs, forward and inverse conversion color appearance model (CAM) IDs, a gamut mapping ID, and a cache data ID for each combination of the components of the color matching workflow which are managed by combination IDs.

A device management table 2402 manages cache data of the input converter 2204 and output converter 2211. More specifically, the table 2402 stores a device name, plug-in name, profile name, and cache data ID for each device information ID. Note that the device management table 2402 has a table configuration having cache data as a primary key. Note also that each profile 1303 includes information indicating colorimetric values and that indicating a colorimetric environment (calorimetric conditions).

A CAM management table 2403 stores a white point, the luminance value of an adapting visual field, the degree of adaptation, the relative luminance value of a background, impact of surround, a color induction factor, and the cache data ID for each CAM ID.

A gamut mapping management table 2404 stores a plug-in name and cache data ID for each gamut mapping ID.

A cache management table 2406 stores a cache data file name and modification data ID for each cache data ID.

A modification management table 2405 stores a modification data file name for each modification data ID. In other words, the modification management table 2405 manages the modification log of cache data. Note that the modification management table 2405 has a table configuration having modification data as a primary key.

A designation table 2407 stores a combination ID corresponding to the color matching workflow used by the user as log information.

With these tables, files that store cache data and modification data for the color matching workflow corresponding to the combination ID or the color conversion corresponding to the device information ID (device name) can be easily and accurately read out from the storing unit 2202.

Modifying the cache data 1304 of the input converter 2204 and output converter 2211 is to change the components of the color matching workflow. Therefore, the cache data 1304 of the system characteristic application unit 2214 must be re-created in terms of its characteristics. Furthermore, the cache data 1304 of the system characteristic application unit 2214, which are associated with those of the input converter 2204 and output converter 2211 and are currently inactive, require update processing. If such data are not updated, a matching problem is posed (for example, identical modification results cannot be reflected in identical devices).

However, the cache data 1304 of the system characteristic application unit 2214 exist as many as the number of components of the color matching workflow, i.e., the number of combinations of components, and the number of cache data 1304 is huge. If all the related cache data 1304 of the system characteristic application unit 2214 are updated, the number of processing steps increases, thus imposing a heavier load. Hence, a mechanism for managing the cache data 1304 is provided to appropriately select the cache data 1304 to be updated of the system characteristic application unit 2214.

Some implementation methods of such mechanism are available. For example, an application (to be referred to as "cache manager" hereinafter) such as a manger for managing the cache data 1304 resides in the controller 2201 to monitor the cache data 1304 stored in the storing unit 2202. Upon detection of updating of the cache data 1304 of the input converter 2204 and output converter 2211, the cache manager selects and updates the cache data 1304 to be updated of the system characteristic application unit 2214 with reference to the designation table 2407. Note that the mode of the cache manager is not particularly limited. The cache data 1304 to be selected of the system characteristic application unit 2214 are those which can be selected using the log information of the designation table 2407 such as data whose frequency or count of use exceeds a predetermined threshold, data which was used within past 30 days, and the like.

In this manner, updating of the cache data 1304 of the input converter 2204 and output converter 2211 stored in the storing unit 2202 is detected, and the corresponding modification contents are reflected in the cache data 1304 of the system characteristic application unit 2214 associated with the updated cache data 1304. In this manner, even in the color matching workflows including different components, the color conversion processing that reflects the modification result can be applied.

Furthermore, the combination ID of the color matching workflow used by the user is saved as a log, and the cache data 1304 of the system characteristic application unit 2214 in which the modification contents are to be reflected are selected. In this manner, the number of cache data 1304 of the system characteristic application unit 2214 in which the modification contents are to be reflected can be limited, and the time required for the update processing can be shortened.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-252680, filed on Aug. 31, 2005, and No. 2005-252478, filed Aug. 31, 2005, which are hereby incorporated by reference herein in their entirety.

What is claimed is:

1. A method of applying, to data of a color space depending on an input device, input conversion for converting into data of a device-independent color space, gamut mapping for mapping on data of a gamut of an output device, and output conversion for converting into data of a color space depending on the output device, the method comprising the steps of:

generating individual conversion characteristic data of one of the input conversion, the gamut mapping, and the output conversion for each device information indicating one of the input device and the output device, and for each conversion setting;

generating integrated conversion characteristic data by combining conversion characteristics of the input conversion, the gamut mapping, and the output conversion for each combination of the device information of the input device and the output device, and for each conversion setting;

converting input data into output data using one of the individual conversion characteristic data and the integrated conversion characteristic data;

editing the conversion setting of one of the input conversion, the gamut mapping, and the output conversion; and modifying the individual conversion characteristic data and the integrated conversion characteristic data in accordance with the edited contents.

2. The method according to claim 1, further comprising the step of managing a use log of the integrated conversion characteristic data, wherein the modifying step includes a step of determining the integrated conversion characteristic data to be modified based on the use log.

3. The method according to claim 1, wherein the converting step includes a step of using one of the individual conversion characteristic data and the integrated conversion characteristic data with reference to a table which associates the device information with the individual conversion characteristic data and the integrated conversion characteristic data.

4. The method according to claim 3, wherein the modifying step includes a step of updating the table based on the modification.

5. A color processing apparatus for applying, to data of a color space depending on an input device, input conversion for converting into data of a device-independent color space, gamut mapping for mapping on data of a gamut of an output device, and output conversion for converting into data of a color space depending on the output device, comprising:

a first generator, arranged to generate individual conversion characteristic data of one of the input conversion, the gamut mapping, and the output conversion for each device information indicating one of the input device and the output device, and for each conversion setting;

a second generator, arranged to generate integrated conversion characteristic data by combining conversion characteristics of the input conversion, the gamut mapping, and the output conversion for each combination of the device information of the input device and the output device, and for each conversion setting;

a converter, arranged to convert input data into output data using one of the individual conversion characteristic data and the integrated conversion characteristic data;

an editor, arranged to edit the conversion setting of one of the input conversion, the gamut mapping, and the output conversion; and a modifier, arranged to modify the individual conversion characteristic data and the integrated conversion characteristic data in accordance with the edited contents.

6. A computer program product stored in a computer readable medium comprising program code for a method of applying, to data of a color space depending on an input device, input conversion for converting into data of a device-independent color space, gamut mapping for mapping on data of a gamut of an output device, and output conversion for converting into data of a color space depending on the output device, the method comprising the steps of:

generating individual conversion characteristic data of one of the input conversion, the gamut mapping, and the output conversion for each device information indicating one of the input device and the output device, and for each conversion setting;

generating integrated conversion characteristic data by combining conversion characteristics of the input conversion, the gamut mapping, and the output conversion for each combination of the device information of the input device and the output device, and for each conversion setting;

converting input data into output data using one of the individual conversion characteristic data and the integrated conversion characteristic data;

editing the conversion setting of one of the input conversion, the gamut mapping, and the output conversion; and modifying the individual conversion characteristic data and the integrated conversion characteristic data in accordance with the edited contents.

* * * * *